United States Patent
McGuire et al.

(10) Patent No.: US 12,475,798 B2
(45) Date of Patent: Nov. 18, 2025

(54) UAS WORK PRACTICE

(71) Applicant: SeekOps Inc., Austin, TX (US)

(72) Inventors: Michael Price McGuire, Austin, TX (US); Gregorio Nunez, Pflugerville, TX (US); Brendan James Smith, Lakeway, TX (US)

(73) Assignee: SeekOps Inc., Austin, TX (US)

( * ) Notice: Subject to any disclaimer, the term of this patent is extended or adjusted under 35 U.S.C. 154(b) by 72 days.

(21) Appl. No.: 18/016,346

(22) PCT Filed: Jul. 16, 2021

(86) PCT No.: PCT/US2021/042061
§ 371 (c)(1),
(2) Date: Jan. 15, 2023

(87) PCT Pub. No.: WO2022/016107
PCT Pub. Date: Jan. 20, 2022

(65) Prior Publication Data
US 2023/0274651 A1     Aug. 31, 2023

Related U.S. Application Data

(60) Provisional application No. 63/053,272, filed on Jul. 17, 2020.

(51) Int. Cl.
*G08G 5/00* (2025.01)
*B64U 10/14* (2023.01)
(Continued)

(52) U.S. Cl.
CPC ............... *G08G 5/30* (2025.01); *B64U 10/14* (2023.01); *G06V 20/17* (2022.01); *G08G 5/55* (2025.01); *G08G 5/57* (2025.01); *B64U 2101/35* (2023.01)

(58) Field of Classification Search
CPC .... G08G 5/003; G08G 5/0069; G08G 5/0013; G08G 5/0034; G08G 5/0091;
(Continued)

(56) References Cited

U.S. PATENT DOCUMENTS 3,780,566 A   12/1973   Smith et al.
4,135,092 A   1/1979   Milly
(Continued)

FOREIGN PATENT DOCUMENTS

AU   3401499 A   11/1999
CN   101470072 A   7/2009
(Continued)

OTHER PUBLICATIONS

U.S. Appl. No. 62/687,147, filed Jun. 19, 2018, Brendan James Smith.
(Continued)

*Primary Examiner* — Peter D Nolan
*Assistant Examiner* — Demetra R Smith-Stewart
(74) *Attorney, Agent, or Firm* — Command IP LLP; Michael Zarrabian

(57) ABSTRACT

Systems, devices, and methods including a processor having addressable memory, the processor configured to: determine coordinates of one or more equipment groups; determine coordinates of one or more flight lines about the determined coordinates of the one or more equipment groups; generate one or more waypoints along the determined coordinates of the one or more flight lines; and generate a flight path along the generated one or more waypoints.

26 Claims, 27 Drawing Sheets

(51) Int. Cl.
  *G06V 20/17* (2022.01)
  *G08G 5/30* (2025.01)
  *G08G 5/55* (2025.01)
  *G08G 5/57* (2025.01)
  *B64U 101/35* (2023.01)

(58) Field of Classification Search
  CPC .............. B64U 10/14; B64U 2101/35; B64U 2201/104; G06V 20/17; G05D 2107/70; G05D 2109/20; G05D 1/2295; G05D 1/606; G05D 1/689; G05D 2105/89
  See application file for complete search history.

(56) References Cited

U.S. PATENT DOCUMENTS

| | | |
|---|---|---|
| 4,233,564 A | 11/1980 | Kerbel |
| 4,507,558 A | 3/1985 | Bonne |
| 4,651,010 A | 3/1987 | Javan |
| 4,988,833 A | 1/1991 | Lai |
| 5,047,639 A | 9/1991 | Wong |
| 5,075,619 A | 12/1991 | Said |
| 5,173,749 A | 12/1992 | Tell et al. |
| 5,291,265 A | 3/1994 | Kebabian |
| 5,317,156 A | 5/1994 | Cooper et al. |
| 5,767,780 A | 6/1998 | Smith et al. |
| 5,822,058 A | 10/1998 | Adler-Golden et al. |
| 6,064,488 A | 5/2000 | Brand et al. |
| 6,295,859 B1 | 10/2001 | Hayden et al. |
| 6,356,350 B1 | 3/2002 | Silver et al. |
| 6,509,566 B1 | 1/2003 | Wamsley et al. |
| 6,549,630 B1 | 4/2003 | Bobisuthi |
| 7,162,933 B2 | 1/2007 | Thompson et al. |
| 7,800,751 B1 | 9/2010 | Silver et al. |
| 7,833,480 B2 | 11/2010 | Blazewicz et al. |
| 8,060,270 B2 | 11/2011 | Vian et al. |
| 8,294,899 B2 | 10/2012 | Wong |
| 8,451,120 B2 | 5/2013 | Johnson, Jr. et al. |
| 8,730,461 B2 | 5/2014 | Andreussi |
| 9,183,371 B2 | 11/2015 | Narendra et al. |
| 9,183,731 B1 | 11/2015 | Bokhary |
| 9,235,974 B2 | 1/2016 | Johnson, Jr. et al. |
| 9,250,175 B1 | 2/2016 | McManus |
| 9,494,511 B2 | 11/2016 | Wilkins |
| 9,599,529 B1 | 3/2017 | Steele et al. |
| 9,599,597 B1 | 3/2017 | Steele et al. |
| 10,023,311 B2 | 7/2018 | Lai et al. |
| 10,023,323 B1 | 7/2018 | Roberts et al. |
| 10,031,040 B1 | 7/2018 | Smith et al. |
| 10,126,200 B1 | 11/2018 | Steele et al. |
| 10,268,198 B2 | 4/2019 | Mantripragada et al. |
| 10,325,485 B1 | 6/2019 | Schuster |
| 10,365,646 B1 | 7/2019 | Farnsworth et al. |
| 10,429,546 B1 | 10/2019 | Ulmer |
| 10,677,771 B2 | 6/2020 | Dittberner et al. |
| 10,753,864 B2 | 8/2020 | Kasten et al. |
| 10,816,458 B2 | 10/2020 | Kasten et al. |
| 10,830,034 B2 | 11/2020 | Cooley et al. |
| 10,962,437 B1 | 3/2021 | Nottrott et al. |
| 11,105,784 B2 | 8/2021 | Kukreja et al. |
| 11,112,308 B2 | 9/2021 | Kreitinger et al. |
| 11,275,068 B2 | 3/2022 | Willett |
| 11,299,268 B2 | 4/2022 | Christensen et al. |
| 11,519,855 B2 | 12/2022 | Black et al. |
| 11,557,212 B2 | 1/2023 | Hong |
| 11,614,430 B2 | 3/2023 | Buckingham et al. |
| 11,619,562 B2 | 4/2023 | Leen et al. |
| 11,710,411 B2 | 7/2023 | Van Meeteren et al. |
| 11,748,866 B2 | 9/2023 | Vargas |
| 12,015,386 B2 | 6/2024 | Gatabi et al. |
| 2002/0005955 A1 | 1/2002 | Kramer et al. |
| 2003/0160174 A1 | 8/2003 | Grant et al. |
| 2003/0189711 A1 | 10/2003 | Orr et al. |
| 2003/0230716 A1 | 12/2003 | Russell et al. |
| 2004/0012787 A1 | 1/2004 | Galle et al. |
| 2004/0017762 A1 | 1/2004 | Sogawa et al. |
| 2004/0212804 A1 | 10/2004 | Neff et al. |
| 2006/0015290 A1 | 1/2006 | Warburton et al. |
| 2006/0044562 A1 | 3/2006 | Hagene et al. |
| 2006/0232772 A1 | 10/2006 | Silver |
| 2006/0234621 A1 | 10/2006 | Desrochers et al. |
| 2007/0137318 A1 | 6/2007 | Desrochers et al. |
| 2008/0169934 A1 | 7/2008 | Lang et al. |
| 2008/0243372 A1 | 10/2008 | Bodin et al. |
| 2009/0201507 A1 | 8/2009 | Kluczynski et al. |
| 2009/0263286 A1 | 10/2009 | Isomura et al. |
| 2009/0326792 A1 | 12/2009 | McGrath |
| 2010/0004798 A1 | 1/2010 | Bodin et al. |
| 2010/0131207 A1 | 5/2010 | Lippert et al. |
| 2010/0140478 A1 | 6/2010 | Wilson et al. |
| 2010/0147081 A1 | 6/2010 | Thomas |
| 2011/0035149 A1 | 2/2011 | McAndrew et al. |
| 2011/0074476 A1 | 3/2011 | Heer et al. |
| 2011/0150035 A1 | 6/2011 | Hanson et al. |
| 2011/0164251 A1 | 7/2011 | Richter |
| 2011/0213554 A1 | 9/2011 | Archibald et al. |
| 2011/0242659 A1 | 10/2011 | Eckles et al. |
| 2011/0257944 A1 | 10/2011 | Du et al. |
| 2012/0120397 A1 | 5/2012 | Furtaw et al. |
| 2013/0044314 A1 | 2/2013 | Koulikov et al. |
| 2013/0061692 A1 | 3/2013 | Muresan et al. |
| 2013/0076900 A1 | 3/2013 | Mrozek et al. |
| 2013/0208262 A1 | 8/2013 | Andreussi |
| 2014/0172323 A1 | 6/2014 | Marino |
| 2014/0204382 A1 | 7/2014 | Christensen |
| 2014/0236390 A1 | 8/2014 | Mohamadi |
| 2014/0336957 A1 | 11/2014 | Hanson et al. |
| 2015/0039256 A1 | 2/2015 | Michalske |
| 2015/0072633 A1 | 3/2015 | Massarella et al. |
| 2015/0145954 A1 | 5/2015 | Pulleti et al. |
| 2015/0226575 A1 | 8/2015 | Rambo |
| 2015/0275114 A1 | 10/2015 | Tumiatti et al. |
| 2015/0295543 A1 | 10/2015 | Brown et al. |
| 2015/0316473 A1 | 11/2015 | Kester et al. |
| 2015/0323449 A1 | 11/2015 | Jones et al. |
| 2015/0336667 A1 | 11/2015 | Srivastava et al. |
| 2016/0018373 A1 | 1/2016 | Pagé et al. |
| 2016/0070265 A1 | 3/2016 | Liu et al. |
| 2016/0104250 A1 | 4/2016 | Allen et al. |
| 2016/0146696 A1 | 5/2016 | Steele et al. |
| 2016/0161456 A1 | 6/2016 | Risk et al. |
| 2016/0202225 A1 | 7/2016 | Feng et al. |
| 2016/0214715 A1 | 7/2016 | Meffert |
| 2016/0216172 A1 | 7/2016 | Rella et al. |
| 2016/0307447 A1 | 10/2016 | Johnson et al. |
| 2016/0334538 A1* | 11/2016 | Rieker .................. G01J 3/021 |
| 2016/0357192 A1 | 12/2016 | McGrew et al. |
| 2017/0003684 A1 | 1/2017 | Knudsen |
| 2017/0057081 A1 | 3/2017 | Krohne |
| 2017/0089829 A1 | 3/2017 | Bartholomew et al. |
| 2017/0093122 A1 | 3/2017 | Bean et al. |
| 2017/0097274 A1 | 4/2017 | Thorpe et al. |
| 2017/0115218 A1 | 4/2017 | Huang et al. |
| 2017/0134497 A1 | 5/2017 | Tarter et al. |
| 2017/0158353 A1 | 6/2017 | Schmick |
| 2017/0199647 A1 | 7/2017 | Richman et al. |
| 2017/0206648 A1 | 7/2017 | Marra et al. |
| 2017/0235018 A1 | 8/2017 | Foster et al. |
| 2017/0259920 A1 | 9/2017 | Lai et al. |
| 2017/0290034 A1 | 10/2017 | Desai et al. |
| 2017/0307519 A1 | 10/2017 | Black et al. |
| 2017/0336281 A1 | 11/2017 | Waxman et al. |
| 2017/0339820 A1 | 11/2017 | Foster et al. |
| 2018/0023974 A1 | 1/2018 | Otani et al. |
| 2018/0024091 A1* | 1/2018 | Wang ................... H04B 1/713 204/431 |
| 2018/0045561 A1 | 2/2018 | Leen et al. |
| 2018/0045596 A1 | 2/2018 | Prasad et al. |
| 2018/0050798 A1 | 2/2018 | Kapuria |
| 2018/0059003 A1 | 3/2018 | Jourdainne |
| 2018/0067066 A1 | 3/2018 | Giedd et al. |
| 2018/0095478 A1 | 4/2018 | Van Cruyningen |
| 2018/0109767 A1 | 4/2018 | Li et al. |
| 2018/0122246 A1 | 5/2018 | Clark |

(56) References Cited

U.S. PATENT DOCUMENTS

| | | | |
|---|---|---|---|
| 2018/0127093 A1 | 5/2018 | Christensen et al. | |
| 2018/0188129 A1 | 7/2018 | Choudhury et al. | |
| 2018/0209902 A1 | 7/2018 | Myshak et al. | |
| 2018/0259955 A1 | 9/2018 | Noto | |
| 2018/0266241 A1 | 9/2018 | Ferguson et al. | |
| 2018/0266946 A1 | 9/2018 | Kotidis et al. | |
| 2018/0284088 A1 | 10/2018 | Verbeck, IV | |
| 2018/0292374 A1* | 10/2018 | Dittberner | G08G 5/55 |
| 2018/0321692 A1 | 11/2018 | Castillo-Effen et al. | |
| 2018/0322699 A1 | 11/2018 | Gray et al. | |
| 2019/0011920 A1 | 1/2019 | Heinonen et al. | |
| 2019/0011935 A1 | 1/2019 | Ham et al. | |
| 2019/0025199 A1 | 1/2019 | Koulikov | |
| 2019/0033194 A1 | 1/2019 | DeFreez et al. | |
| 2019/0049364 A1 | 2/2019 | Rubin | |
| 2019/0066479 A1 | 2/2019 | Wesley et al. | |
| 2019/0077506 A1 | 3/2019 | Shaw et al. | |
| 2019/0086202 A1 | 3/2019 | Guan et al. | |
| 2019/0095687 A1 | 3/2019 | Shaw et al. | |
| 2019/0154874 A1 | 5/2019 | Shams et al. | |
| 2019/0178743 A1 | 6/2019 | McNeil | |
| 2019/0195789 A1 | 6/2019 | Pan et al. | |
| 2019/0204189 A1 | 7/2019 | Mohr, Jr. et al. | |
| 2019/0212419 A1 | 7/2019 | Jeong et al. | |
| 2019/0220019 A1 | 7/2019 | Tan et al. | |
| 2019/0228573 A1 | 7/2019 | Sen et al. | |
| 2019/0234868 A1 | 8/2019 | Tanomura et al. | |
| 2019/0331652 A1 | 10/2019 | Ba et al. | |
| 2020/0019168 A1* | 1/2020 | Guzman | G05D 1/0094 |
| 2020/0050189 A1 | 2/2020 | Gu et al. | |
| 2020/0065433 A1* | 2/2020 | Duff | G01S 5/02 |
| 2020/0109976 A1 | 4/2020 | Ajay et al. | |
| 2020/0135036 A1 | 4/2020 | Campbell | |
| 2020/0182779 A1 | 6/2020 | Kasten et al. | |
| 2020/0249092 A1 | 8/2020 | Podmore et al. | |
| 2020/0309690 A1 | 10/2020 | Green et al. | |
| 2020/0373172 A1* | 11/2020 | Suzuki | H01L 21/6836 |
| 2020/0400635 A1 | 12/2020 | Potyrailo et al. | |
| 2021/0017926 A1 | 1/2021 | Alkadi et al. | |
| 2021/0037197 A1 | 2/2021 | Kester et al. | |
| 2021/0055180 A1 | 2/2021 | Thorpe et al. | |
| 2021/0109074 A1 | 4/2021 | Smith et al. | |
| 2021/0140934 A1 | 5/2021 | Smith et al. | |
| 2021/0190745 A1 | 6/2021 | Buckingham et al. | |
| 2021/0190918 A1 | 6/2021 | Li et al. | |
| 2021/0199565 A1 | 7/2021 | John et al. | |
| 2021/0247369 A1 | 8/2021 | Nottrott et al. | |
| 2021/0255158 A1 | 8/2021 | Smith et al. | |
| 2021/0300591 A1 | 9/2021 | Tian | |
| 2021/0321174 A1 | 10/2021 | Sun et al. | |
| 2021/0364427 A1 | 11/2021 | Smith et al. | |
| 2021/0382475 A1 | 12/2021 | Smith et al. | |
| 2022/0082495 A1 | 3/2022 | Kreitinger et al. | |
| 2022/0113290 A1 | 4/2022 | Smith et al. | |
| 2022/0170810 A1* | 6/2022 | Miller, II | G01S 19/01 |
| 2022/0268952 A1 | 8/2022 | Liang et al. | |
| 2022/0341806 A1 | 10/2022 | Miller et al. | |
| 2022/0357231 A1 | 11/2022 | Nahata et al. | |
| 2022/0397521 A1 | 12/2022 | Scott et al. | |
| 2023/0194487 A1 | 6/2023 | Buckingham et al. | |
| 2023/0213413 A1 | 7/2023 | Mohr, Jr. et al. | |
| 2023/0274651 A1 | 8/2023 | McGuire et al. | |
| 2023/0392498 A1 | 12/2023 | Srivastav et al. | |
| 2024/0142371 A1 | 5/2024 | Scott et al. | |
| 2024/0273648 A1 | 8/2024 | Cook et al. | |

FOREIGN PATENT DOCUMENTS

| | | |
|---|---|---|
| CN | 104458588 A | 3/2015 |
| CN | 205749271 U | 11/2016 |
| CN | 106568516 A | 4/2017 |
| CN | 106769977 A | 5/2017 |
| CN | 107703075 A | 2/2018 |
| CN | 109780452 A | 5/2019 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 0450809 A2 | 10/1991 |
| EP | 1371962 B1 | 7/2011 |
| EP | 3339855 A1 | 6/2018 |
| FR | 3047073 A1 | 7/2017 |
| FR | 3047073 B1 | 8/2019 |
| GB | 2538563 A | 11/2016 |
| JP | H08247939 A | 9/1996 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020030885 A1 | 2/2020 |
| WO | 2020086499 A1 | 4/2020 |
| WO | 2020206006 A1 | 10/2020 |
| WO | 2020206008 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

"Safesite Multi-Threat Detection System", Jul. 11, 2012 (Jul. 11, 2012), pp. 1-6, XP055245980.

International Search Report and Written Opinion for PCT/US19/38011 mailed Sep. 9, 2019.

International Search Report and Written Opinion for PCT/US19/38015, mailed Oct. 18, 2019.

International Search Report and Written Opinion for PCT/US19/44119, mailed Oct. 17, 2019.

International Search Report and Written Opinion for PCT/US20/26228 mailed Jul. 1, 2020.

International Search Report and Written Opinion for PCT/US20/26232 mailed Jun. 26, 2020.

International Search Report and Written Opinion for PCT/US20/26246 mailed Jun. 29, 2020.

International Search Report and Written Opinion for PCT/US20/51696, mailed Feb. 3, 2021.

International Search Report and Written Opinion for PCT/US2020/044978, mailed Oct. 26, 2020.

International Search Report and Written Opinion for PCT/US2021/016821 mailed Apr. 26, 2021.

International Search Report and Written Opinion for PCT/US2021/024177, mailed Jun. 23, 2021.

International Search Report and Written Opinion for PCT/US2021/056708, mailed Jan. 27, 2022.

International Search Report and Written Opinion for PCT/US21/42061, mailed Nov. 26, 2021.

International Search Report and Written Opinion for PCT/US21/44532, mailed Jan. 11, 2022.

International Search Report and Written Opinion for PCT/US21/56710, mailed Feb. 23, 2022.

International Search Report and Written Opinion for PCT/US22/38951, mailed Nov. 28, 2022.

International Search Report and Written Opinion of PCT/US19/57305, mailed Jan. 2, 2020.

International Search Report and Written Opinion of PCT/US20/54117, mailed Dec. 22, 2020.

(56) References Cited

OTHER PUBLICATIONS

Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.
Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Feb. 1, 2012), pp. 23101-23101, XP012161835, ISSN: 0034-6748, DOI: 10.1063/1.3680593.
Khan, "Low Power Greenhouse Gas Sensors for Unmanned Aerial Vehicles", Remote Snse. 2012, 4, 1355-1368.
Krings et al., Atmos. Meas. Tech., 11, 721-739, Feb. 7, 2018.
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
Feng, Lingbing, Nowak, Gen, O'Neill, T.J., Welsh, A.H."CUTOFF; A spatio-temporal imputation method." Journal of Hydrology 519 (2014) : 3591-3605 (Year:2014).
International Search Report and Written Opinion for PCT/US2023/023933 mailed Sep. 26, 2023.
International Search Report and Written Opinion for PCT/US23/13893, mailed Jun. 30, 2023.
Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).
Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).
Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).
Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).
Miyama, Toru et al., Estimating allowable carbon emission for CO2 concentration stabilization using a GCM-based Earth system model, Geophysical Research Letters, vol. 36,L19709, doi:10.1029/2009GL039678, 2009, pp. 0094-8276 (Year:2009).
Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C. et al., Interpreting seasonal changes in the carbon balance of southern Amazonia using measurements of XCO2 and chlorophyll fluorescence from GOSAT, Geophysical Research Letters, vol. 40.2829-2833, doi: 10.1002/grl.50452, 2013 pp. 0 2829-0 2833 (Year:2013).
Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial CO2 anomalies with portable laser remote sensing and 2d tomography, The Leading Edge Mar. 2018, pp. 306-313 (Year:2018).
Adame J A et al: "Application of cluster analysis to surface ozone, NOand SOdaily patterns in an industrial area in Central-Southern Spain measured with a DOAS system", Science of the Total Environment, Elsevier, Amsterdam, NL, vol. 429, Apr. 11, 2012 (Apr. 11, 2012), pp. 281-291, XP028491183, ISSN: 0048-9697, DOI: 10.1016/J.SCITOTENV.2012.04.032.
Uehara, K: "Dependence of harmonic signals 1-15 on sample-gas parameters in wavelength-modulation spectroscopy for precise absorption measurements", Applied Physics B, Springer Berlin Heidelberg, Berlin/Heidelberg, vol. 67, Jan. 2, 1998, pp. 517-523, XP007921671, ISSN:0946-2171, DOI: 10.1007/S003400050537.
Cabreira et al. "Survey on Coverage Path Planning with Unmanned Aerial Vehicles", published: Drones, published: Jan. 2019, pp. 1-38, year 2019.
International Search Report and Written Opinion for PCT/US23/23905 mailed Oct. 5, 2023.
IEEE Conference Paper, "Research of the high pressure jet performance of small size nozzle," ISBN :978-1-5090-1087-5,Publication Date : Oct. 1, 2016, Conference dates Oct. 10, 2016 thru Oct. 12, 2016.[retrieved from the Internet] on Sep. 1, 2023 at 4:14pm.
Field Trial of Methane Emission Quantification Technologies, Society of Petroleum Engineers, SPE-201537-MS, Allen et al., Oct. 2020.
Development of a mobile tracer correlation method for assessment of air emissions from landfills and other area sources, Atmospheric Environment 102 (2015) 323-330. T.A. Foster-Wittig et. al. 2015.
Measurements of Methane Emissions from Landfills Using a Time Correlation Tracer Method Based on FTIR Absorption Spectroscopy, Environ. Sci. Technol. 2001, 35, 21-25, B. Galle et. al. 2001.
Lilian Joly, The evolution of AMULSE (Atmospheric Measurements by Ultra-Light Spectrometer) and its interest in atmospheric applications. Results of the Atmospheric Profiles of GreenhousE gasEs (APOGEE) weather balloon release campaign for satellite retrieval validation, p. 1-28, Sep. 25, 2019, Atmospheric Measurement Techniques Discussion (Joly).
Coombes et al, "Optimal Polygon Decomposition for UAV Survey Coverage Path Planning in Wind", published: Jul. 2018, publisher: 'Sensors' (Year:2018).
He et al. "Static Targets' Track Path for UAVs Meeting the Revisit Interval Requirement", published :2013, publisher : IEEE (Year:2013).
Day, S., and et al. "Characterisation of regional fluxes of methane in the Surat Basin, Queensland, Phase 1: A review and analysis of literature on methane detection and flux determination." (2013) (Year: 2013).
Tao Lei et al:"Low-power, open-path mobile sensing platform for high-resolution measurements of greenhouse gases and air pollutants", Applied Physics B, Springer Berlin Heidelberg, Berlin/Heidelberg, vol. 119, No. 1, Mar. 10, 2015 (Mar. 10, 2015), pp. 153.-164, XP035445836, ISSN: 0946-2171, DOI: 10.1007/S00340-015-6069-1 [retrieved on Mar. 10, 2015].
Tarsitano C G et al: Multilaser Herriott Cell for Planetary Tunable Laser Spectrometers, Applied Optics , Optical Society of America, Washington, DC, US, vol. 46, No. 28, Oct. 1, 2007 (Oct. 1, 2007), pp. 6923-6935, XP001508502, ISSN:0003-6935, DOI: 10.1364/AO.46.006923.
Feitz Andrew et al: "The Ginninderra CH4 and CO2 release experiment: An evaluation of gas detection and quantification techniques", International Journal of Greenhouse Gas Control, Elsevier, Amsterdam, NL, vol. 70, Mar. 15, 2018 (Mar. 15, 2018), pp. 202-224, XP085368237, ISSN: 1750-5836, DOI: 10.1016/J.IJGGC.2017.11.018.
Jensen Morten Bang et al: "Quantification of greenhouse gas emissions from a biological waste treatment facility", Waste Management, Elsevier, New York, NY, US, vol. 67, May 29, 2017 (May 29, 2017), pp. 375-384, XP085157318, ISSN: 0956-053X, DOI: 10.1016/J.WASMAN.2017.05.033.
Mohn Joachim et al: "A dual tracer ratio method for comparative emission measurements in an experimental dairy housing", Atmospheric Environment, Elsevier, Amsterdam, NL, vol. 179, Feb. 1, 2018 (Feb. 1, 2018), pp. 12-22, XP085370597, ISSN: 1352-2310, DOI: 10.1016/J.ATMOSENV.2018.01.057.

* cited by examiner

| Facility ID/Name | Emission ID | Date of Survey | Name of Surveyor | Conditions | Average Windspeed | Equipment Group | Source Equipment |
|---|---|---|---|---|---|---|---|
| Pad 1 | 1 | 4/29/2020 | Mike | Sunny, 85°F | 5 m/s | Wellheads | W1 |
| Pad 1 | 2 | 4/29/2020 | Mike | Sunny, 85°F | 3 m/s | Tanks | T3, T4 |
|  |  |  |  |  |  |  |  |
|  |  |  |  |  |  |  |  |
|  |  |  |  |  |  |  |  |

FIG. 8

UAS WORK PRACTICE

CROSS-REFERENCE TO RELATED APPLICATION

This application is a 35 U.S.C § 371 National Stage Entry of International Application No. PCT/US21/42061, filed Jul. 16, 2021, which claims the priority benefit of U.S. Provisional Patent Application Ser. No. 63/053,272 filed Jul. 17, 2020, all of which are hereby incorporated herein by reference in their entirety for all purposes.

FIELD OF ENDEAVOR

The invention relates to trace gas detection, and more particularly to trace gas detection at a survey location.

BACKGROUND

Methane (CH4) is an odorless and colorless naturally occurring organic molecule, which is present in the atmosphere at average ambient levels of approximately 1.85 ppm as of 2018 and is projected to continually climb. While methane is found globally in the atmosphere, a significant amount is collected or "produced" through anthropogenic processes including exploration, extraction, and distribution of petroleum in the form of natural gas. Natural gas, an odorless and colorless gas, is a primary source of energy used to produce electricity and heat. The main component of natural gas is methane (93.9 mol % CH4 typ.). While extraction of natural gas is a large source of methane released to atmosphere, major contributors of methane also include livestock farming (enteric fermentation), and solid waste and wastewater treatment (anaerobic digestion). Optical cells may be used to detect methane and other trace gasses.

SUMMARY

A system embodiment may include: a processor having addressable memory, the processor configured to: determine coordinates of one or more equipment groups; determine coordinates of one or more flight lines about the determined coordinates of the one or more equipment groups; generate one or more waypoints along the determined coordinates of the one or more flight lines; and generate a flight path along the generated one or more waypoints.

Additional system embodiments may include at least one trace-gas sensor disposed on an unmanned aerial vehicle, the trace-gas sensor configured to generate gas data. In additional system embodiments, the processor may be further configured to receive the generated gas data from the UAV, where the UAV follows a flight path along the generated one or more waypoints.

In additional system embodiments, the processor may be further configured to: select a border for the one or more equipment groups. In additional system embodiments, the determined coordinates of the one or more equipment groups may be one or more global positioning system (GPS) coordinates, and the determined coordinates for the one or more flight lines may be one or more GPS coordinates. In additional system embodiments, the determined coordinates of the one or more flight flights may be a buffer based on the determined coordinates of the one or more equipment groups. In additional system embodiments, the buffer may be based on at least one of: an equipment type in the one or more equipment groups, a user preference corresponding to the equipment type, and one or more rules or laws corresponding to the equipment type.

In additional system embodiments, the generated one or more waypoints may be based on at least one of: an equipment type in the one or more equipment groups, a wind direction, a wind variation, and one or more obstacles located proximate the one or more equipment groups. In additional system embodiments, the determined coordinates of the one or more equipment groups may form a first closed shape, and the determined coordinates of the one or more flight lines may form a second closed shape. In additional system embodiments, the first closed shape and the second closed shape may be rectangles.

In additional system embodiments, the flight path may be a downwind flight pattern. In additional system embodiments, the flight path may be an upwind flight pattern. In additional system embodiments, the flight path may be a spiral flight pattern.

A method embodiment may include: determining coordinates of one or more equipment groups; determining coordinates of one or more flight lines about the determined coordinates of the one or more equipment groups; and generating one or more waypoints along the determined coordinates of the one or more flight lines.

Additional method embodiments may include: selecting a border for the one or more equipment groups in an image. In additional method embodiments, the determined coordinates of the one or more equipment groups are one or more global positioning system (GPS) coordinates, and where the determined coordinates for the one or more flight flights are one or more GPS coordinates. In additional method embodiments, the determined coordinates of the one or more flight flights are a buffer based on the determined coordinates of the one or more equipment groups. In additional method embodiments, the buffer is based on at least one of: an equipment type in the one or more equipment groups, a user preference corresponding to the equipment type, and one or more rules or laws corresponding to the equipment type.

In additional method embodiments, the generated one or more waypoints are based on at least one of: an equipment type in the one or more equipment groups, a wind direction, a wind variation, and one or more obstacles located proximate the one or more equipment groups. In additional method embodiments, the determined coordinates of the one or more equipment groups forms a first closed shape, and where the determined coordinates of the one or more flight lines forms a second closed shape. In additional method embodiments, the first closed shape and the second closed shape are rectangles.

Additional method embodiments may include: receiving gas data from an unmanned aerial vehicle (UAV) having at least one trace-gas sensor, where the UAV follows a flight path along the generated one or more waypoints.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 8 depicts a table for tracking conditions during one or more flight plans of an aerial vehicle with a trace-gas sensor for detecting gas leaks, according to one embodiment;

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Figure 1:
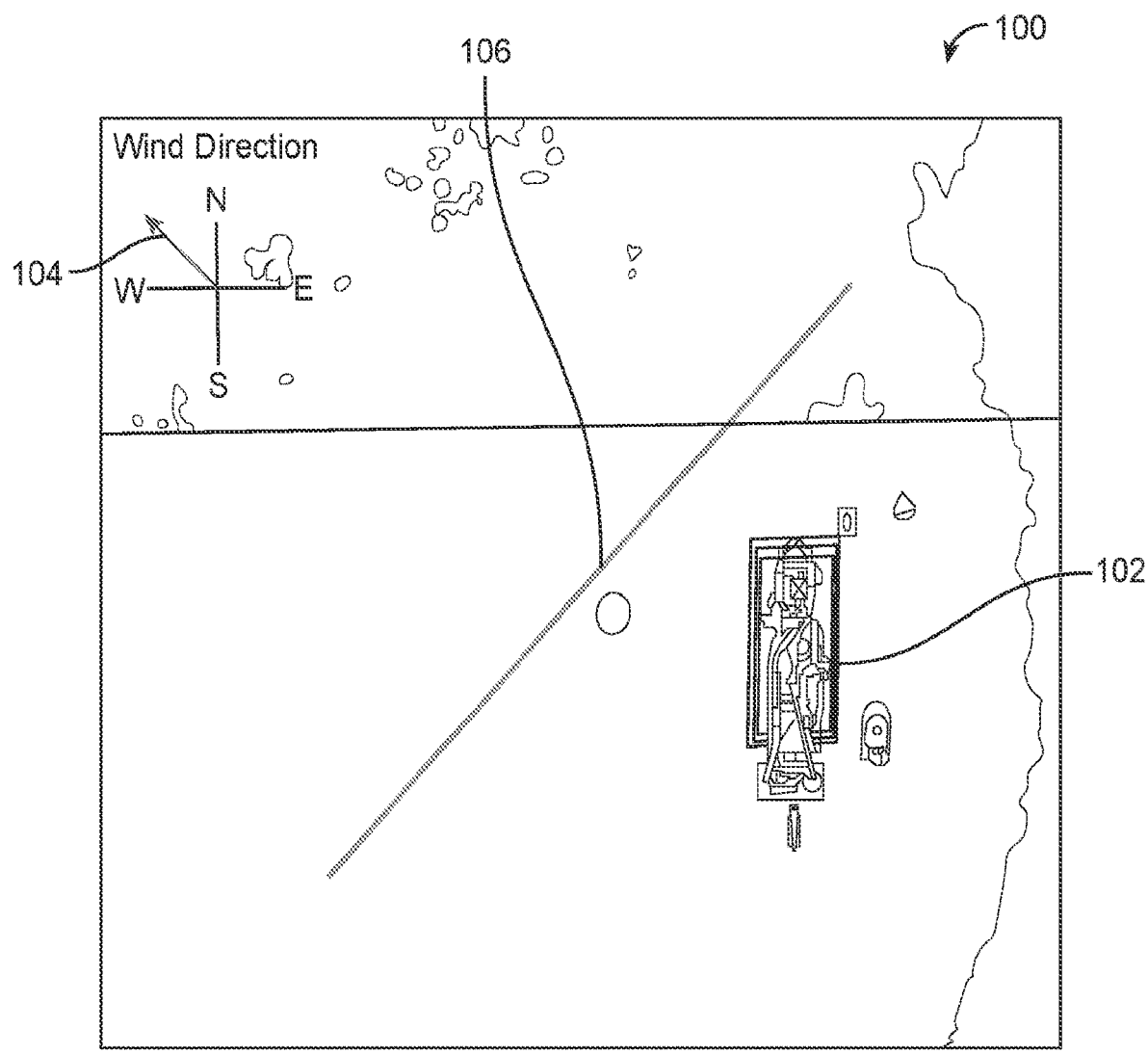
FIG. 1 depicts a system for detecting gas leaks from one or more potential gas sources based on average wind direction, according to one embodiment.

FIG. 1 depicts a system 100 for detecting gas leaks from one or more potential gas sources 102 based on an average wind direction 104, according to one embodiment. An aerial vehicle, such as an unmanned aerial vehicle (UAV), may fly a flight path 106 that is downwind of the potential gas source 102. In some embodiments, the system 100 may gather data on trace gas amounts without context as to what equipment is being surveyed, why flight waypoints were chosen, and the like. This lack of information and consistency may make it difficult to report trace gas amounts and scale to survey multiple sites and/or potential gas sources.

Figure 2A:
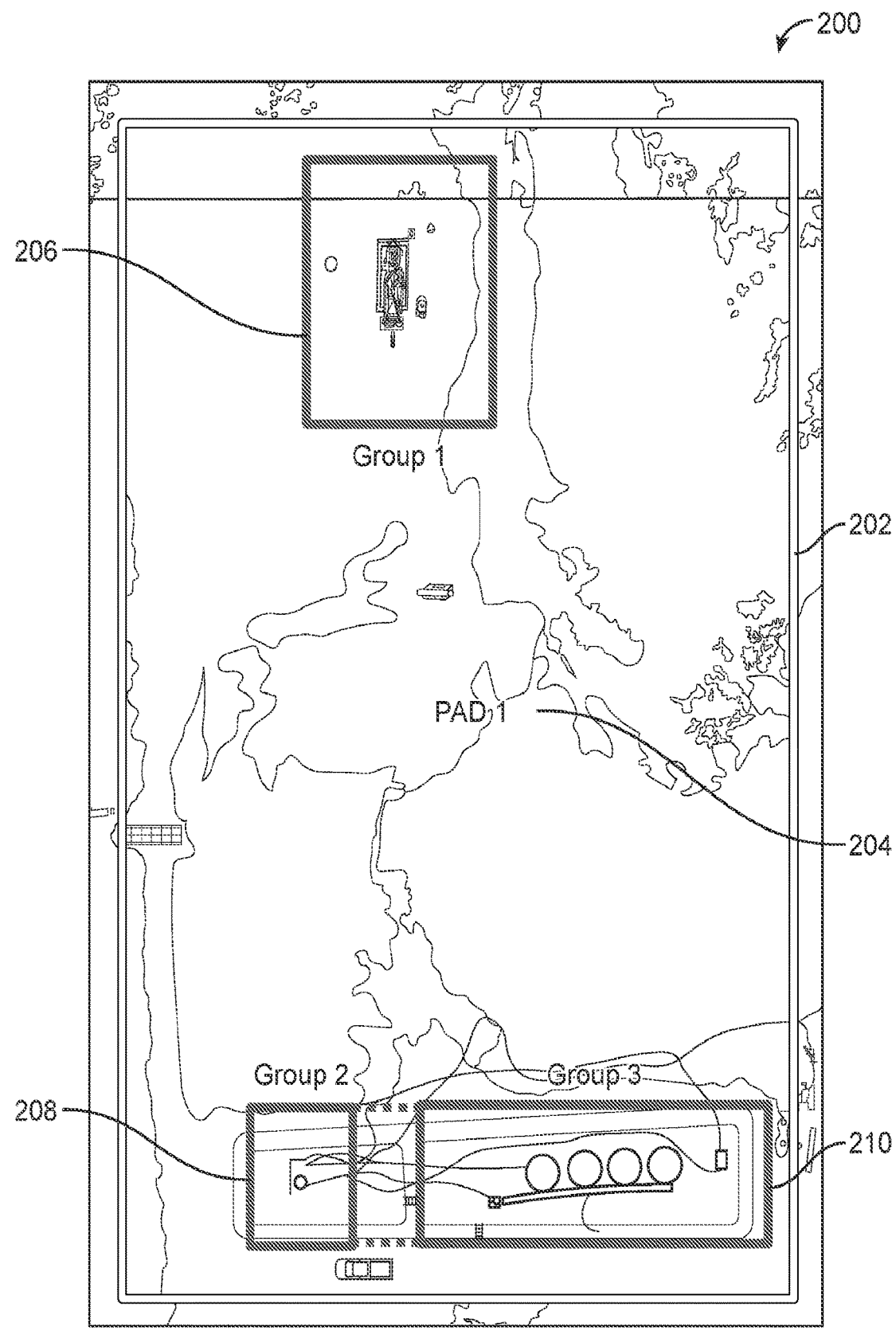
FIG. 2A depicts another system for detecting gas leaks from one or more potential gas sources based on grouping one or more equipment groups, according to one embodiment.

FIG. 2A depicts another system 200 for detecting gas leaks from one or more potential gas sources based on grouping one or more equipment groups, according to one embodiment. The system may include a site or area of interest 202 having relevant pad information 204. The area of interest 202 may be a facility, a geographical area including one or more pads, or the like. The area of interest 202 may include one or more equipment groups. The pad information 204 may include a pad name, a facility name, a facility ID, or the like. In some embodiments, the pad information 204 may be informed deemed relevant by a user or customer. In FIG. 2A, the pad information 204 is depicted as PAD 1.

The system may also include one or more survey groups 206, 208, 210 within each site 202. The survey groups may include a first survey group 206, a second survey group 208, and a third survey group 210. Each survey group 206, 208, 210 includes one or more equipment groups that can be surveyed independently in a single flight of an aerial vehicle, such as an unmanned aerial vehicle (UAV), having one or more trace-gas sensors for detecting gas leaks. In some embodiments, survey groups located near one another may be combined. For example, the second survey group 208 and the third survey group 210 may be combined into a single survey group due to their proximity.

Figure 2B:
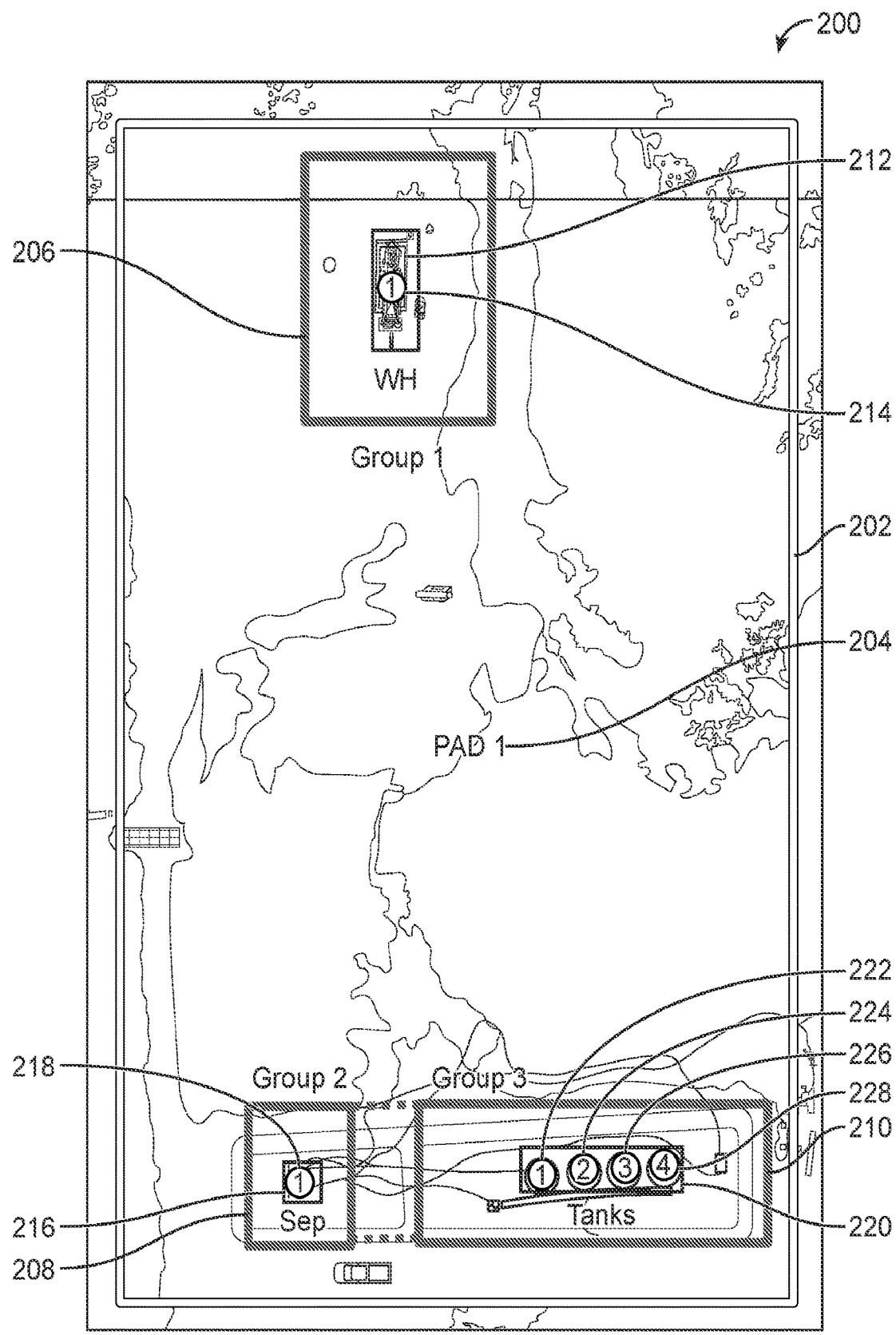
FIG. 2B depicts the system of FIG. 2A with grouping of unique equipment types, according to one embodiment.

FIG. 2B depicts the system 200 of FIG. 2A with grouping of unique equipment types 212, 216, 220, according to one embodiment. Each site 202 may have one or more equipment types 212, 216, 220. For example, the site 202 may have a wellhead equipment type 212, a separator equipment type 216, and a tank equipment type 218. Each equipment type 212, 216, 220 may have a perimeter that contains all components that need to be surveyed. These perimeters may be used for flight planning of the aerial vehicle having one or more trace-gas sensors.

Each piece of equipment within each grouping of equipment type may have a tag 214, 218, 222, 224, 226, 228. In some embodiments, the tags may be named to correspond to a naming system of a user and/or a customer. The wellhead equipment type 212 may have a tag 214 for the wellhead. The separator equipment type 216 may have a tag 218 for the separator. The tank equipment type 218 may have a plurality of tags 222, 224, 226, 228 for each tank. In some embodiments, the tags 222, 224, 226, 228 may be used to determine whether or not a source is more or less likely to emit methane. In some embodiments, this information on likelihood to emit methane may be used to vary the flight path or survey density. In other embodiments, this information on likelihood to emit methane may be further used in the post processing to attribute emissions to groups or equipment tags.

Figure 3A:
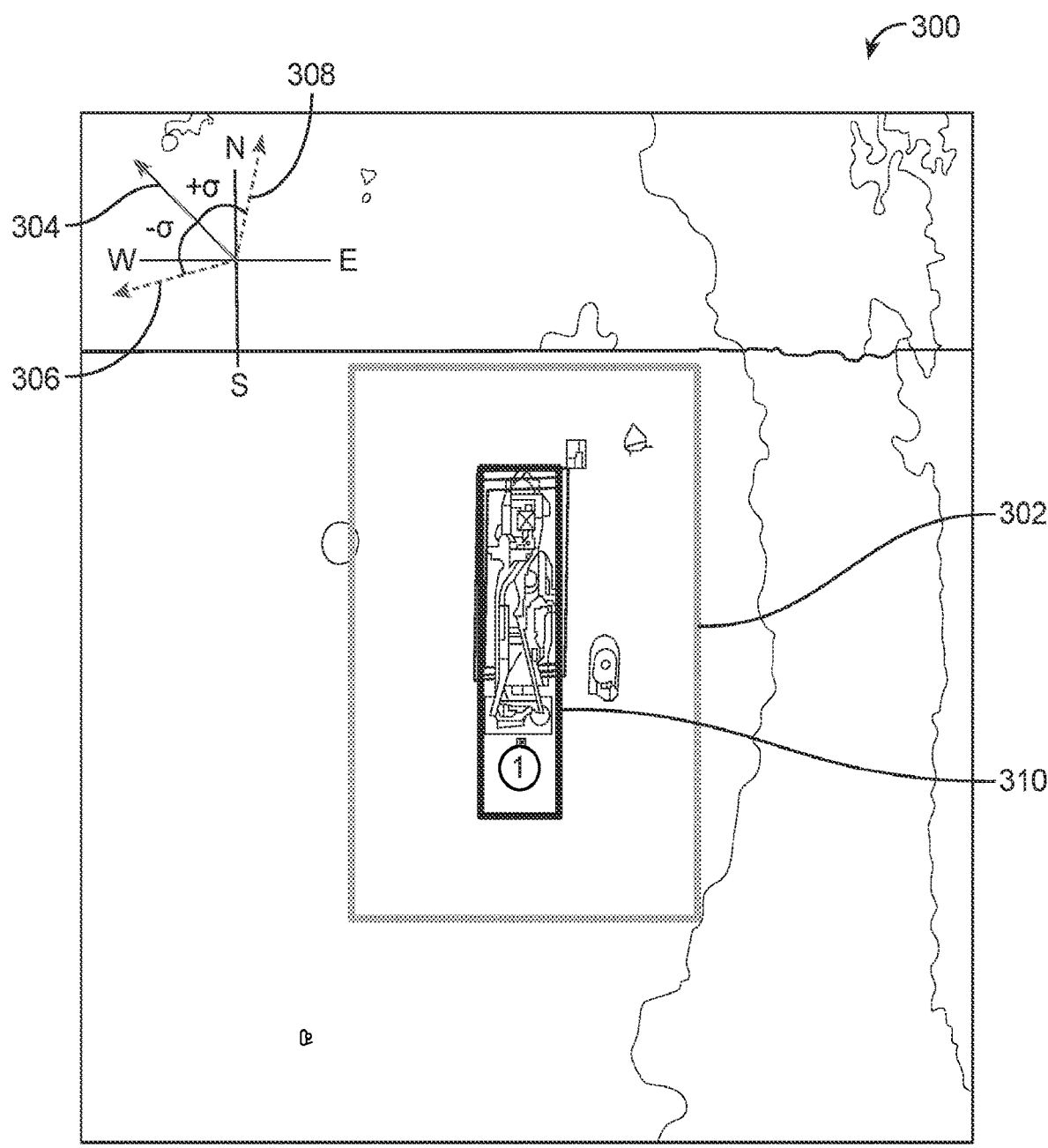
FIG. 3A depicts another system for detecting gas leaks from one or more potential gas sources with designated flight lines, according to one embodiment.

FIG. 3A depicts another system 300 for detecting gas leaks from one or more potential gas sources with designated flight lines 302, according to one embodiment. Designated flight lines 302 for an aerial vehicle having one or more trace-gas sensors are shown about an equipment group 310. The designated flight lines 302 may be predetermined paths around the equipment group 310 that are determined to be safe to fly. The designated flight lines 310 need to be close enough to obtain a desired localization. The designated flight lines 310 may be outside of a designated safety zone, such as intrinsic safety zones, ATEX zones, or other zone designated. In some embodiments, the designated flight lines 302 may be set by intrinsic safety zones. In some embodiments, the distance of the designated flight lines 302 from the equipment group 310 may be any distance that is set by the operator. In other embodiments, the distance of the designated flight lines 302 from the equipment group 310 may be dynamically changed given wind speed, wind direction, and/or trace gas measurements. In some embodiments, GPS points may be taken as part of a site setup.

A wind average 304 and variance may be calculated. Current wind direction and/or average wind direction may be measured. One or more standard deviations 306, 308 of the wind direction may also be determined to account for variable wind conditions. In other embodiments, these vectors may be calculated by a set angle added and subtracted from the average wind. Wind variance may be determined one of three ways. First, wind variance may be determined by an onsite anemometer data gathered before and/or during the flight and determined through sliding window averaging or other method. Second, wind variance may be determined by publicly available data that may be polled before and/or during the flight. Third, wind variance may be determined by prevailing wind direction and variance.

Figure 3B:
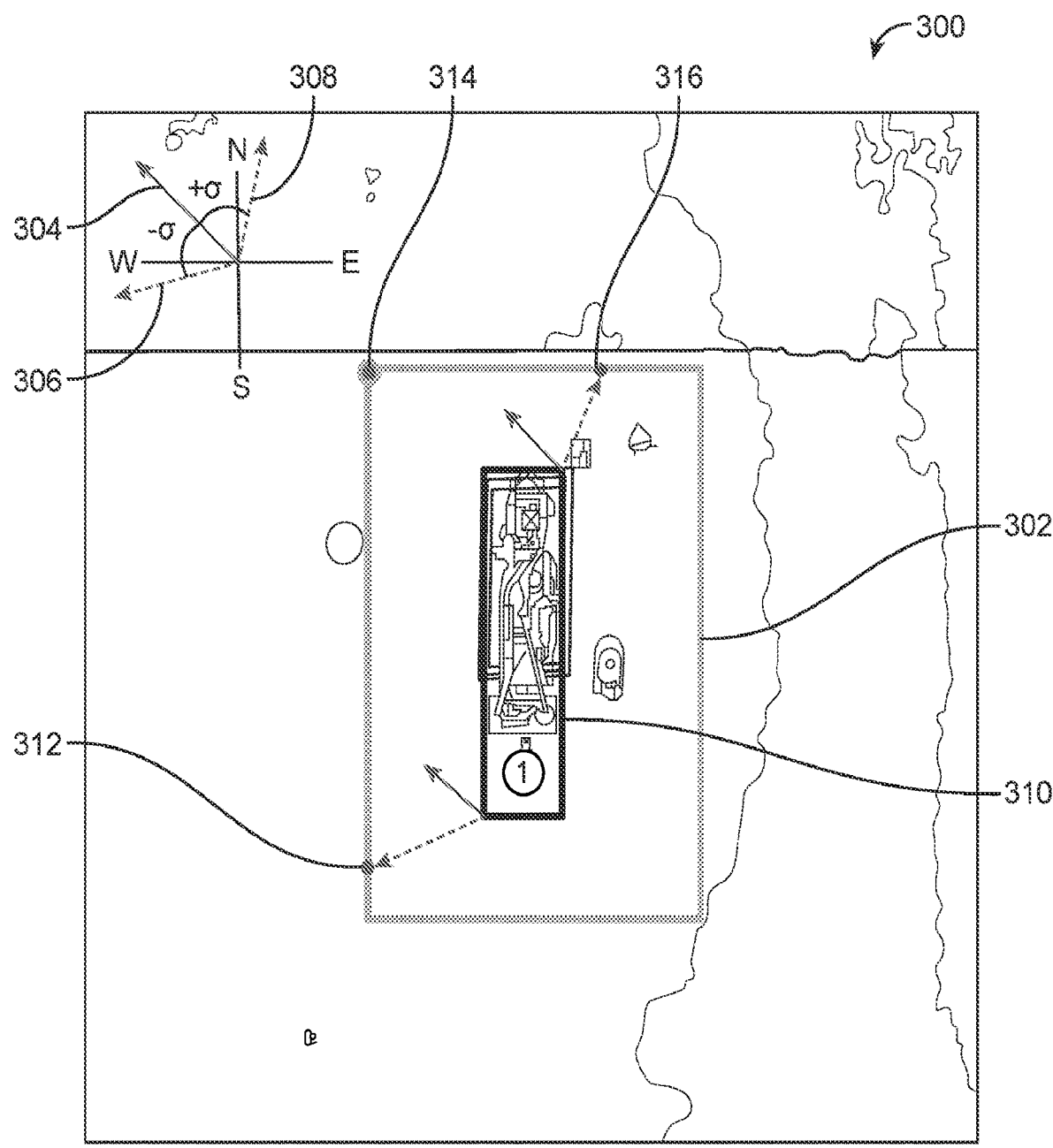
FIG. 3B depicts the system of FIG. 3A with waypoint selection, according to one embodiment.

FIG. 3B depicts the system 300 of FIG. 3A with waypoints 312, 314, 316 selected, according to one embodiment. Using the equipment group 310 boundary and wind variance calculation, one or more waypoints 312, 314, 316 on the designated flight lines 302 can be selected. These waypoints 312 can be manually selected by an operator in some embodiments. In other embodiments, these waypoints 312, 314, 316 can be automatically selected by a ground control system (GCS) device having a processor and addressable memory. In one embodiment, a first waypoint 312 may be determined based on extending lines from the wind direction 304 and a first standard deviation 306 of the wind direction from a corner of the equipment group 310 to the flight lines 302. A second waypoint 316 may be determined based on extending lines from the wind direction 304 and a second standard deviation 308 of the wind direction from an opposite corner of the equipment group 310 to the flight lines 302. A third waypoint 314 may be determined as a connecting corner located on the equipment group 310 boundary between the first waypoint 312 and the second waypoint 316.

Figure 3C:
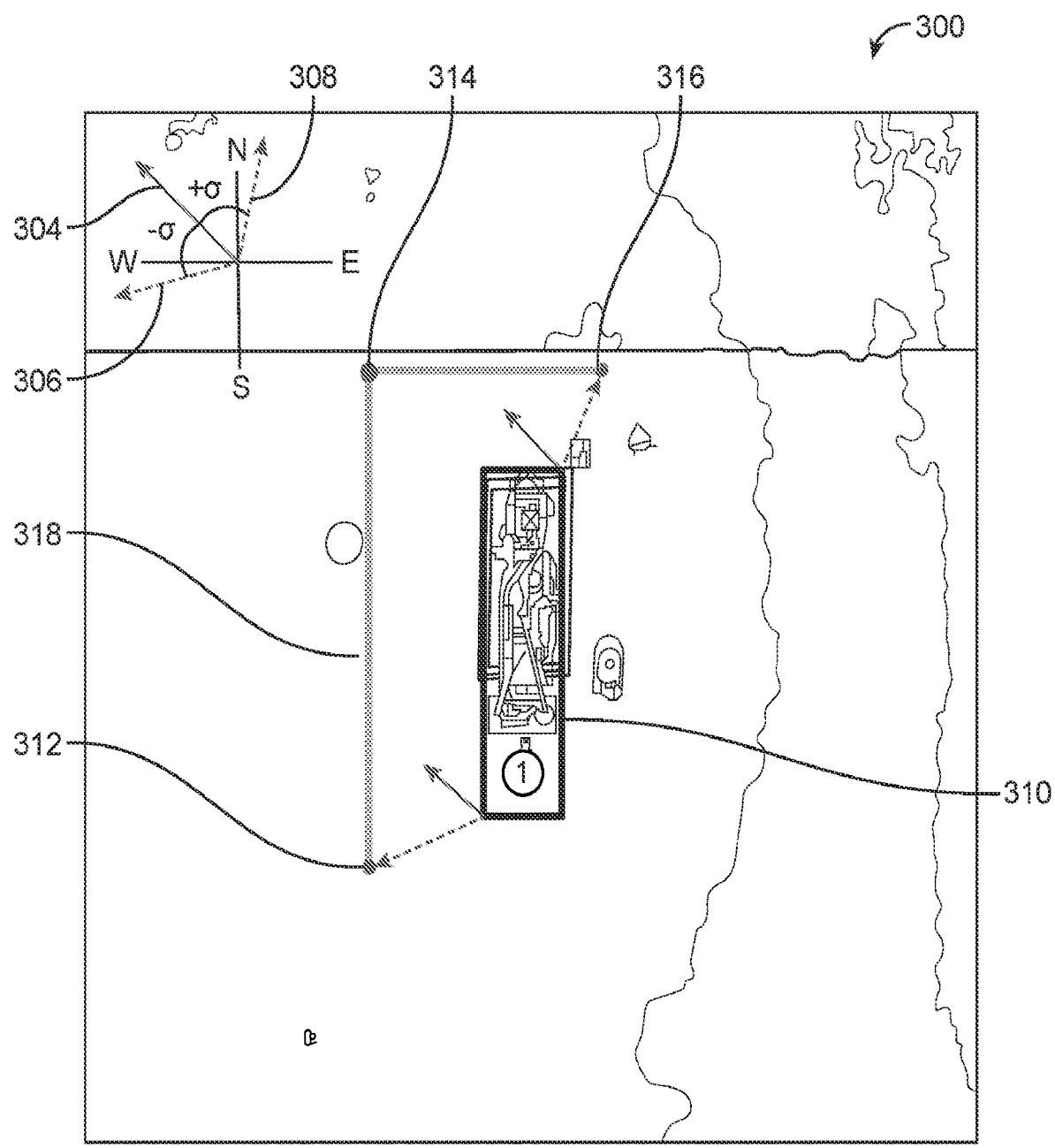
FIG. 3C depicts the system of FIG. 3B with a flight pattern based on the waypoint selection, according to one embodiment.

FIG. 3C depicts the system of FIG. 3B with a flight pattern 318 based on the waypoints 312, 314, 316 selected, according to one embodiment. The flight pattern 318 only encompasses a portion of the overall flight lines 302, as shown in FIG. 3C. An aerial vehicle with at least one trace-gas sensor can fly along the flight pattern 318 instead of the entire circumference shown in the flight lines 302, as shown in FIG. 3C, which allows for increased efficiency, time savings, and energy savings. The operator may plan and execute different flight patterns along the flight pattern 318, such as a downwind flight pattern (See FIG. 4A), an upwind flight pattern (See FIG. 4B), or a spiral flight pattern (See FIG. 4C). The operator may need to provide input on one or more flight parameters, such as minimum altitude, maximum altitude, a step change, and the like.

Figure 4A:
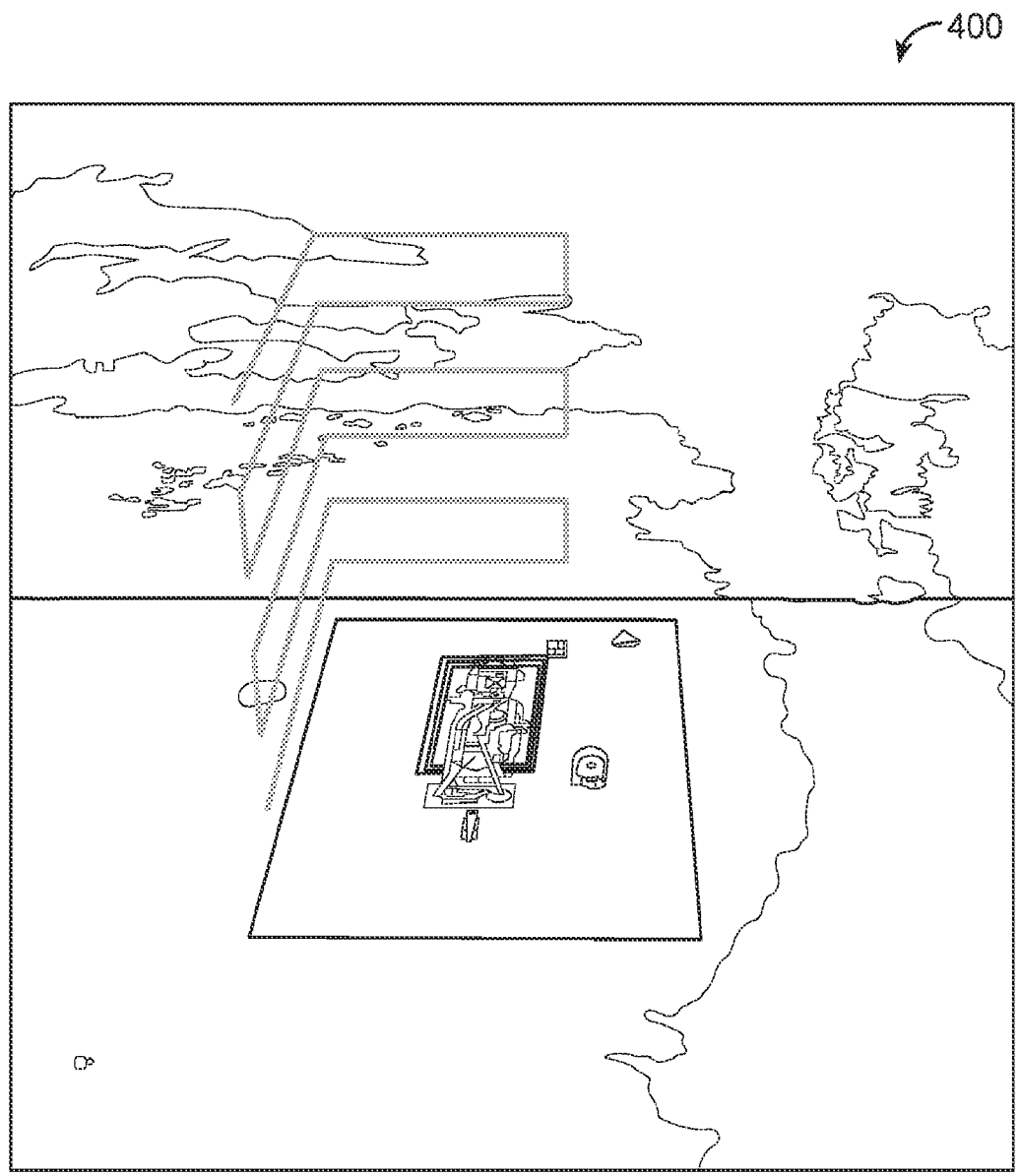
FIG. 4A depicts a downwind flight path for an aerial vehicle with a trace-gas sensor for detecting gas leaks from one or more potential gas sources, according to one embodiment.

FIG. 4A depicts a downwind flight path 400 for an aerial vehicle with a trace-gas sensor for detecting gas leaks from one or more potential gas sources, according to one embodiment.

Figure 4B:
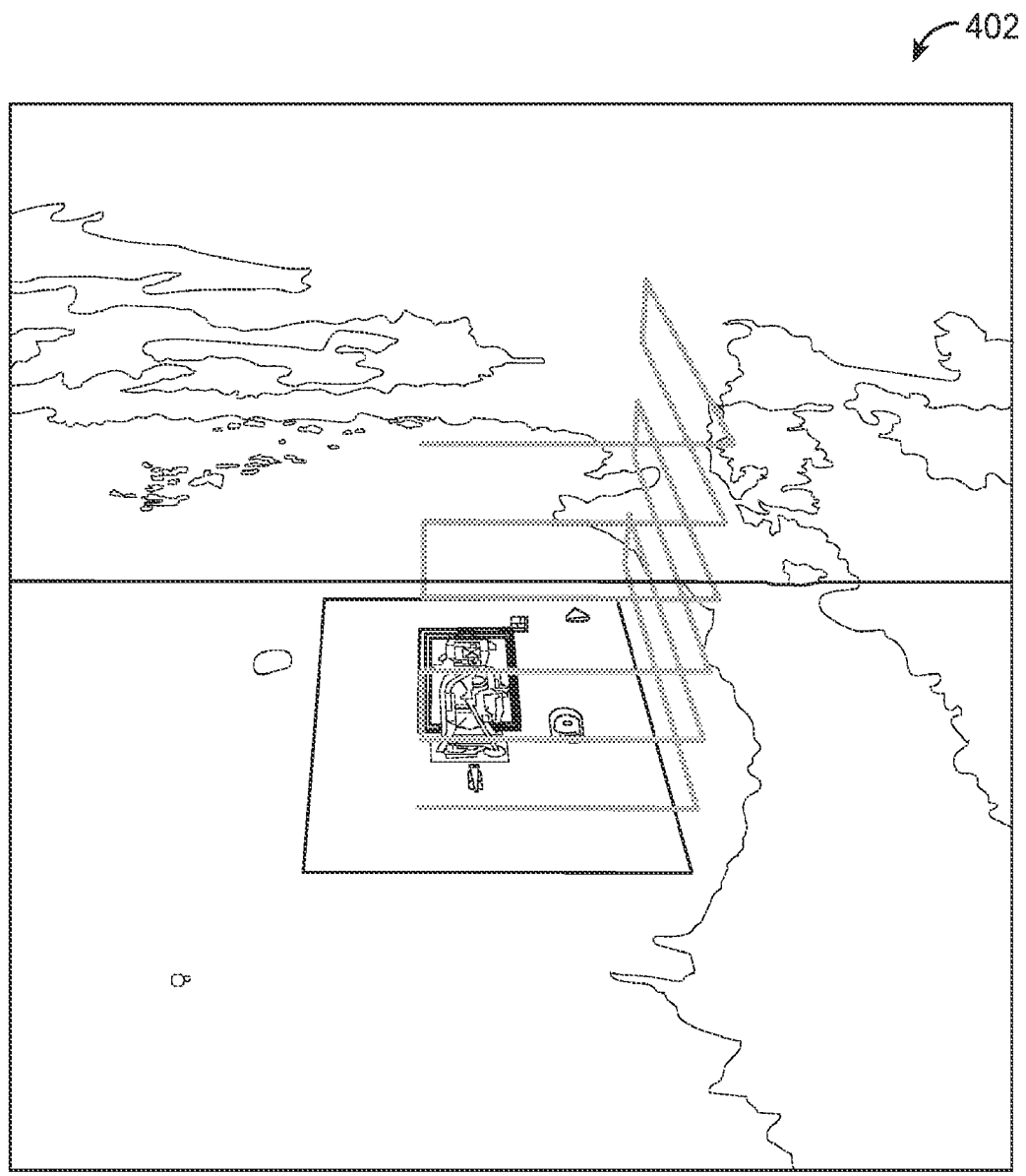
FIG. 4B depicts an upwind flight path for an aerial vehicle with a trace-gas sensor for detecting gas leaks from one or more potential gas sources, according to one embodiment.

FIG. 4B depicts an upwind flight path 402 for an aerial vehicle with a trace-gas sensor for detecting gas leaks from one or more potential gas sources, according to one embodiment.

Figure 4C:
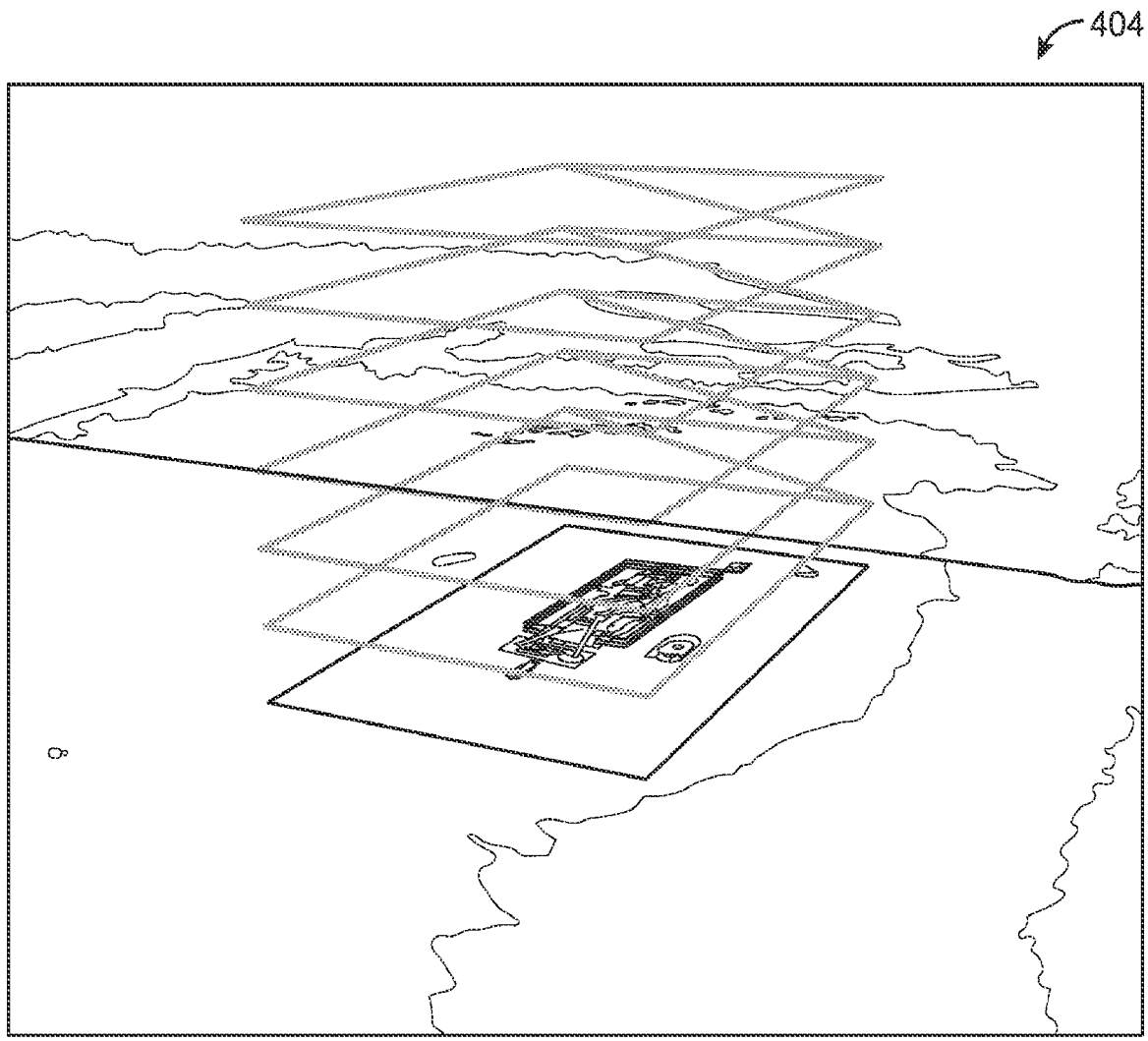
FIG. 4C depicts a full spiral flight path for an aerial vehicle with a trace-gas sensor for detecting gas leaks from one or more potential gas sources, according to one embodiment.

FIG. 4C depicts a full spiral flight path 404 for an aerial vehicle with a trace-gas sensor for detecting gas leaks from one or more potential gas sources, according to one embodiment.

Figure 5A:
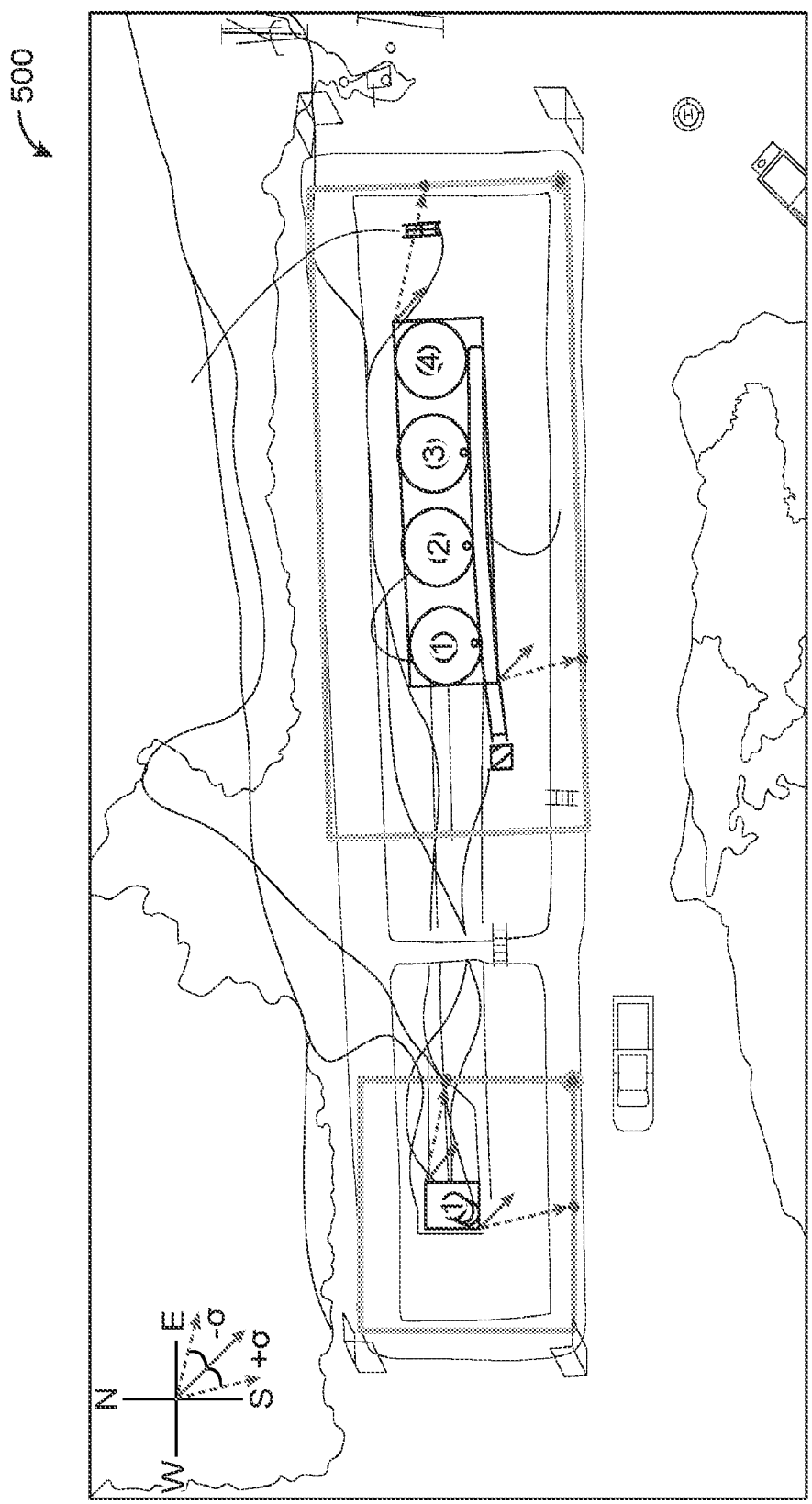
FIG. 5A depicts a top view of a flight plan for an aerial vehicle with a trace-gas sensor for detecting gas leaks where potential gas sources are in different survey groups, according to one embodiment.

FIG. 5A depicts a top view of a flight plan 500 for an aerial vehicle with a trace-gas sensor for detecting gas leaks where potential gas sources are in different survey groups, according to one embodiment. In the flight plan 500 of FIGS. 5A and 5B the separator and tanks are in separate survey groups.

Figure 5B:
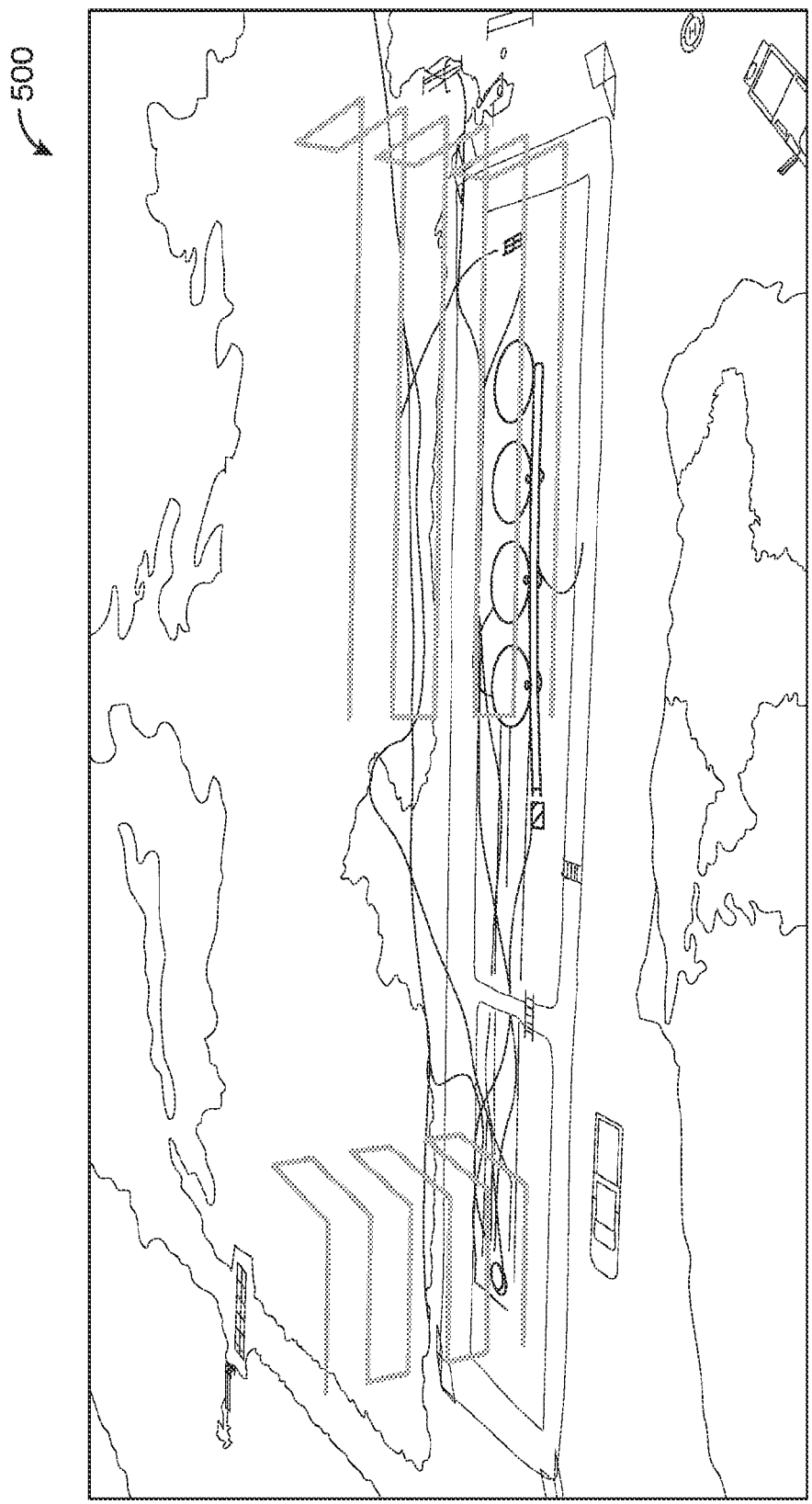
FIG. 5B depicts a perspective view of the flight plan of FIG. 5A, according to one embodiment.

FIG. 5B depicts a perspective view of the flight plan 500 of FIG. 5A, according to one embodiment. The flight plan is shown as a downwind flight plan, such that the flight plan does not include a spiral around each separate survey group.

Figure 6A:
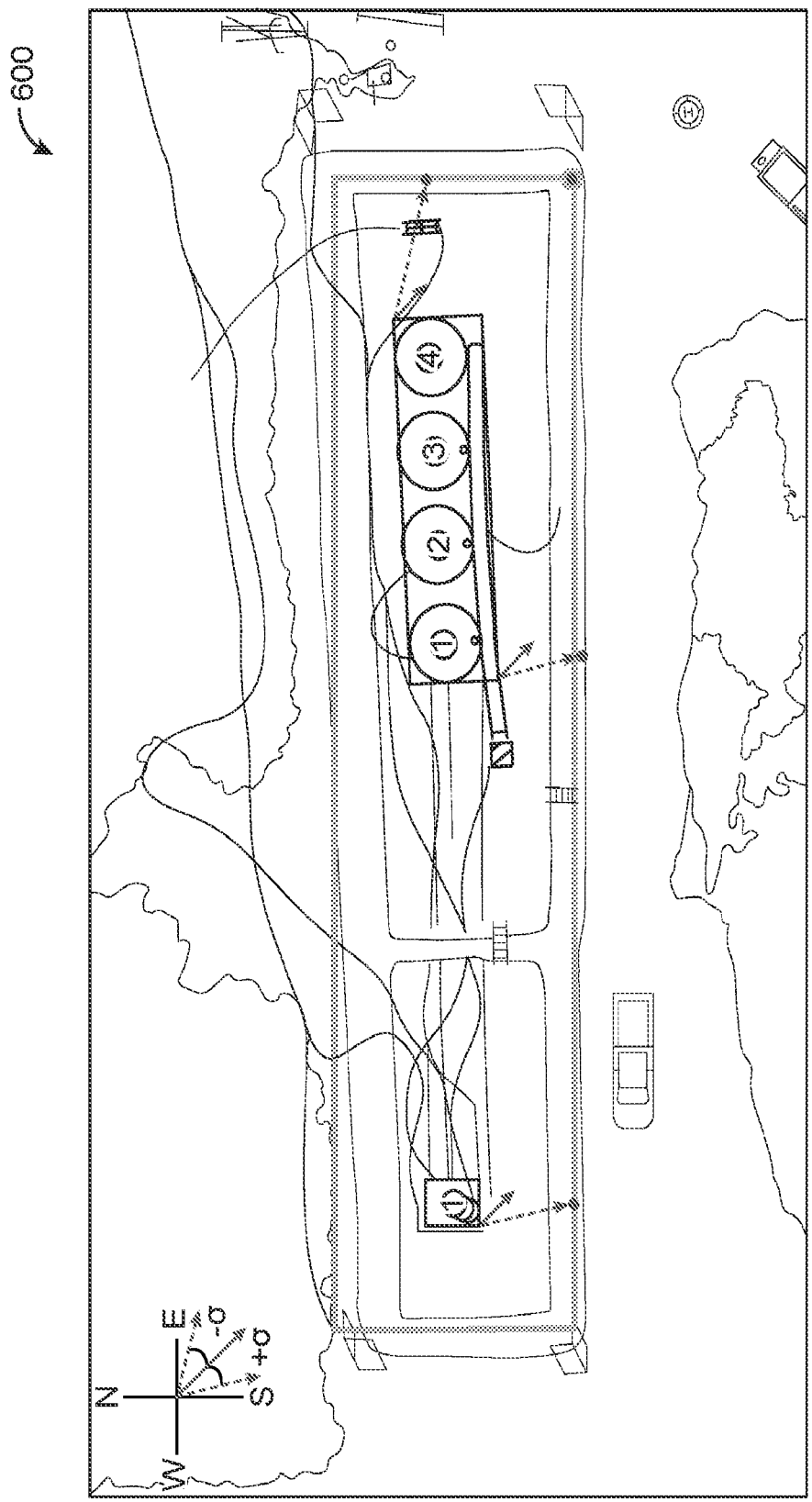
FIG. 6A depicts a top view of a flight plan for an aerial vehicle with a trace-gas sensor for detecting gas leaks where potential gas sources are in a same survey group, according to one embodiment.

FIG. 6A depicts a top view of a flight plan 600 for an aerial vehicle with a trace-gas sensor for detecting gas leaks where potential gas sources are in a same survey group, according to one embodiment. Unlike the flight plan of FIGS. 5A-5B, the flight plan 600 of FIGS. 6A-6B combines the separator and tanks into a single survey group.

Figure 6B:
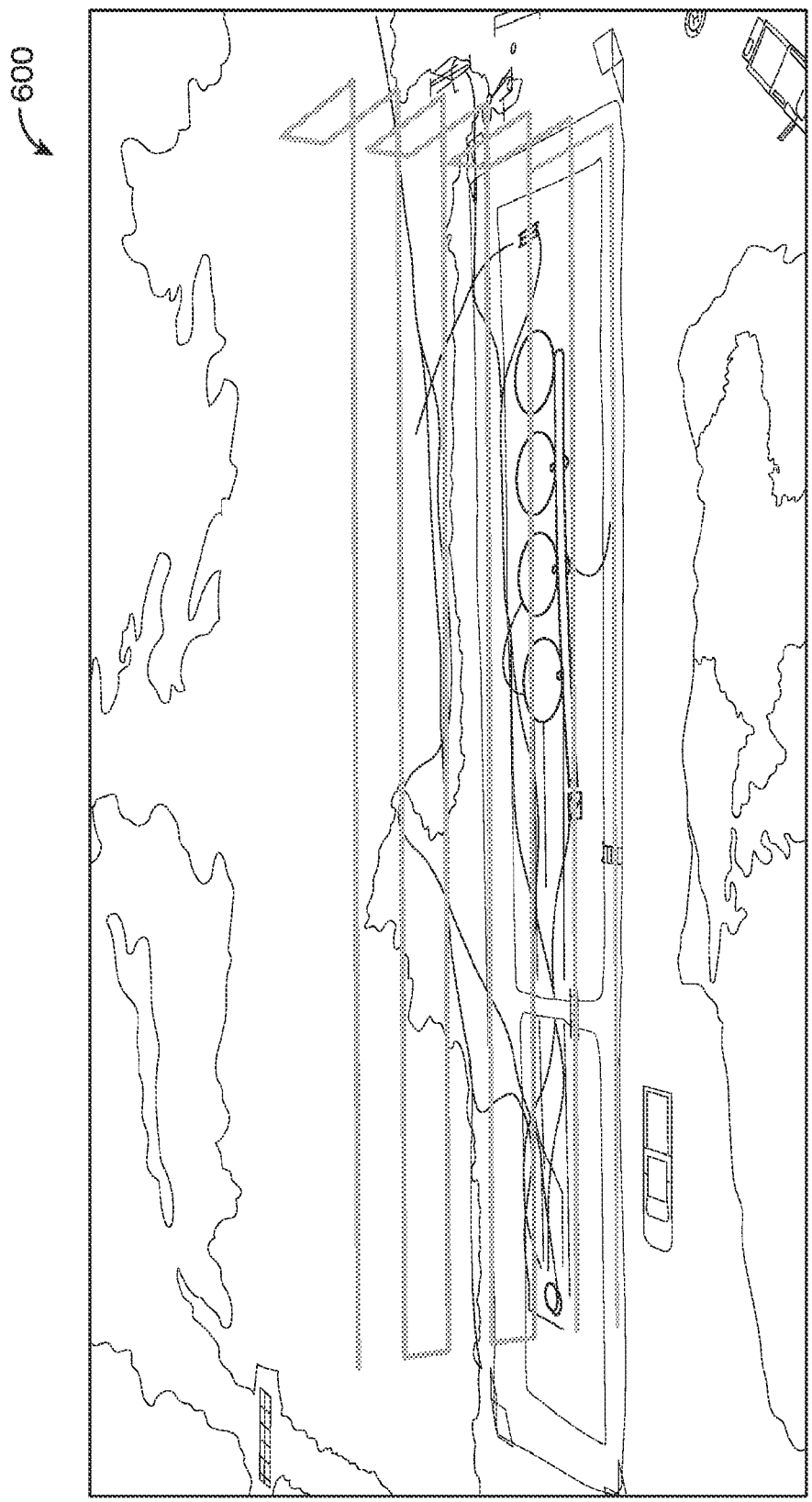
FIG. 6B depicts a perspective view of the flight plan of FIG. 6A, according to one embodiment.

FIG. 6B depicts a perspective view of the flight plan 600 of FIG. 6A, according to one embodiment. The flight plan is shown as a downwind flight plan, such that the flight plan does not include a spiral around the combined survey group.

Figure 7:
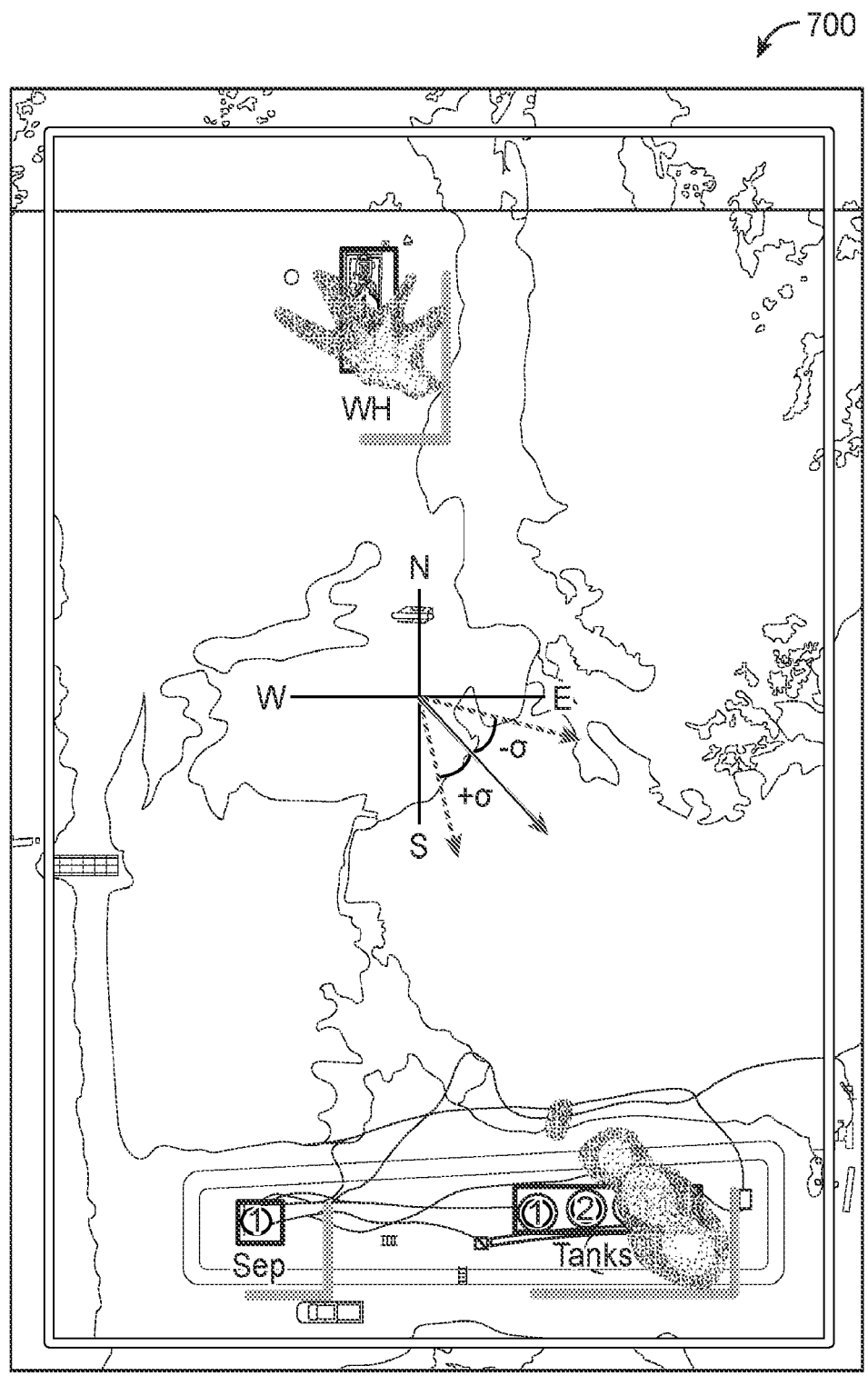
FIG. 7 depicts a top view of flight plans for an aerial vehicle with a trace-gas sensor for detecting gas leaks at multiple grouped potential gas sources, according to one embodiment.

FIG. 7 depicts a top view of flight plans 700 for an aerial vehicle with a trace-gas sensor for detecting gas leaks at multiple grouped potential gas sources, according to one embodiment. Flight lines may be used to keep track of what equipment was surveyed. FIG. 7 shows enhancements at both the wellhead and tanks while the separator is clean. Emissions are likely at the wellhead, and tank three, or tank four. In some embodiments, the system may perform an order of magnitude quantification to assist with repair prioritization. The information shown in FIG. 7 may be exported into a geographic information system (GIS), a spreadsheet format, or the like.

FIG. 8 depicts a table 800 for tracking conditions during one or more flight plans of an aerial vehicle with a trace-gas sensor for detecting gas leaks, according to one embodiment. The table 800 may be used by a surveyor to do follow up inspections. The table 800 may include information on facility name or ID; emission ID, a date of the survey; a name of the surveyor; conditions, such as cloud cover and temperature; an average wind speed; an equipment group, such as wellheads, tanks, and separators; and a source equipment tag. The table in FIG. 8 is shown as an example of a table that may be used with a database to track emissions. Other tables, databases, and/or tracking methods used to track emissions are possible and contemplated.

Figure 9:
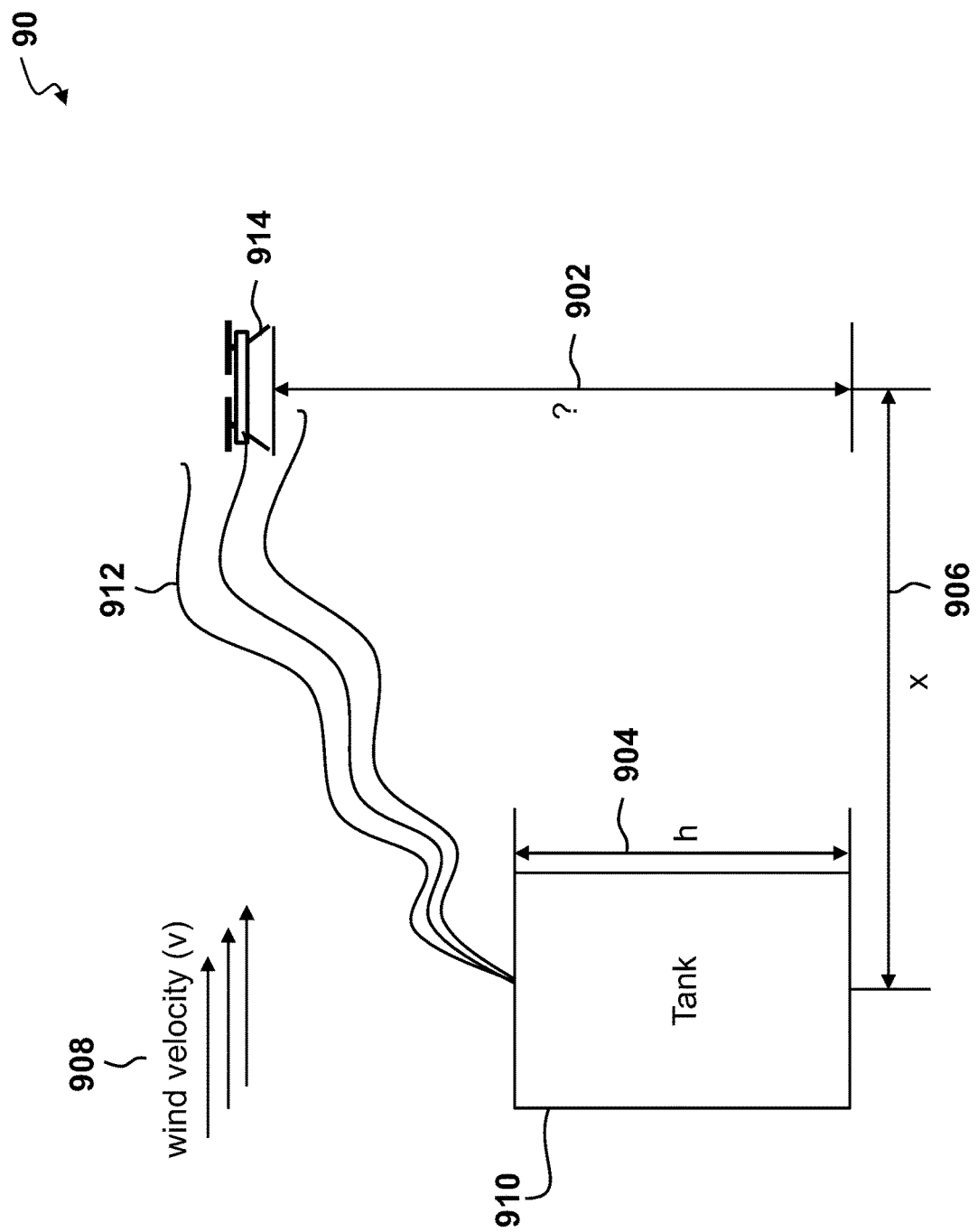
FIG. 9 depicts a maximum altitude needed for an aerial vehicle with a trace-gas sensor based on various factors, according to one embodiment.

FIG. 9 depicts a maximum altitude 902 needed for an aerial vehicle 914 with a trace-gas sensor based on various factors 1000, according to one embodiment. Given (h) 904, (x) 906, and (v) 908, the system may determine the minimum altitude needed to fly to ensure that the aerial vehicle 914 with one or more trace-gas sensors intersects a plume 912 of a potential gas source 1010. A potential gas source 910 height (h) 904 may be a maximum height of a possible trace gas emitting equipment. The potential gas source 910 is depicted as a tank, but other potential trace gas sources are possible and contemplated. A distance (x) 906 may be a distance from the equipment that the aerial vehicle is flying 914 about the potential gas source 910. The wind velocity (v) 908 may include a wind speed, wind direction, wind variability, and/or wind gusts. In some embodiments, a reference table may be used by operators in the field. The maximum altitude 902 may be calculated using physics-based modelling or other modelling to determine the theoretical height of the plume 912 as (x) 906 distance from the source 910. In this figure, the example is a tank, but it can be any emissions source and the height (h) 904 is the height of the actual emission location. This approach yields the altitude range of the aerial vehicle 914 flight flux plan and can be determined in real time and/or prior to flight.

Figure 10A:
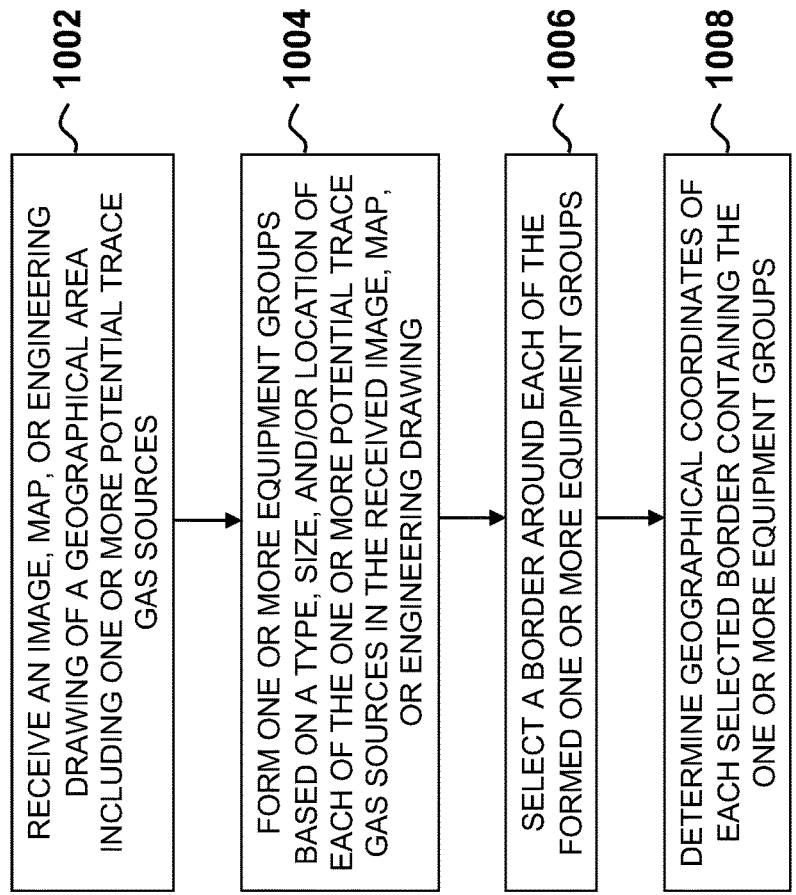
FIG. 10A depicts a high-level flowchart of a method embodiment of determining coordinates of one or more equipment groups, according to one embodiment.

FIG. 10A depicts a high-level flowchart of a method embodiment 1000 of determining coordinates of one or more equipment groups, according to one embodiment. The method 1000 may include receiving an image, map, or engineering drawings of a geographical area including one or more potential trace gas sources (step 1002). In some embodiments, the image may be a satellite image. The image may be any depiction of a geographical area from which geographical coordinates or locations can be determined. The method 1000 may then include forming one or more equipment groups containing the one or more potential trace gas sources in the received image (step 1004). The one or more potential trace gas sources may be grouped together into one or more equipment groups based on their type, size, and/or location. By way of example, two or more tanks located in proximity to one another may be formed into a single combined equipment group. In some embodiments, a processor of the system may form the one or more equipment groups based on the type, size, and/or location of the one or more potential trace gas sources. In other embodiments, an operator may form and/or modify the formed one or more equipment groups.

The method 1000 may then include selecting a border around each of the formed one or more equipment groups (step 1006). In some embodiments, the border may be a rectangle. In other embodiments, the border may be a square, triangle, rhombus, or any other closed shape having three or more sides. The method 1000 may then include determining geographical coordinates of each selected border containing the one or more equipment groups (step 1008). In one embodiment, the geographical coordinates may comprise GPS coordinates of each corner of the border.

Figure 10B:
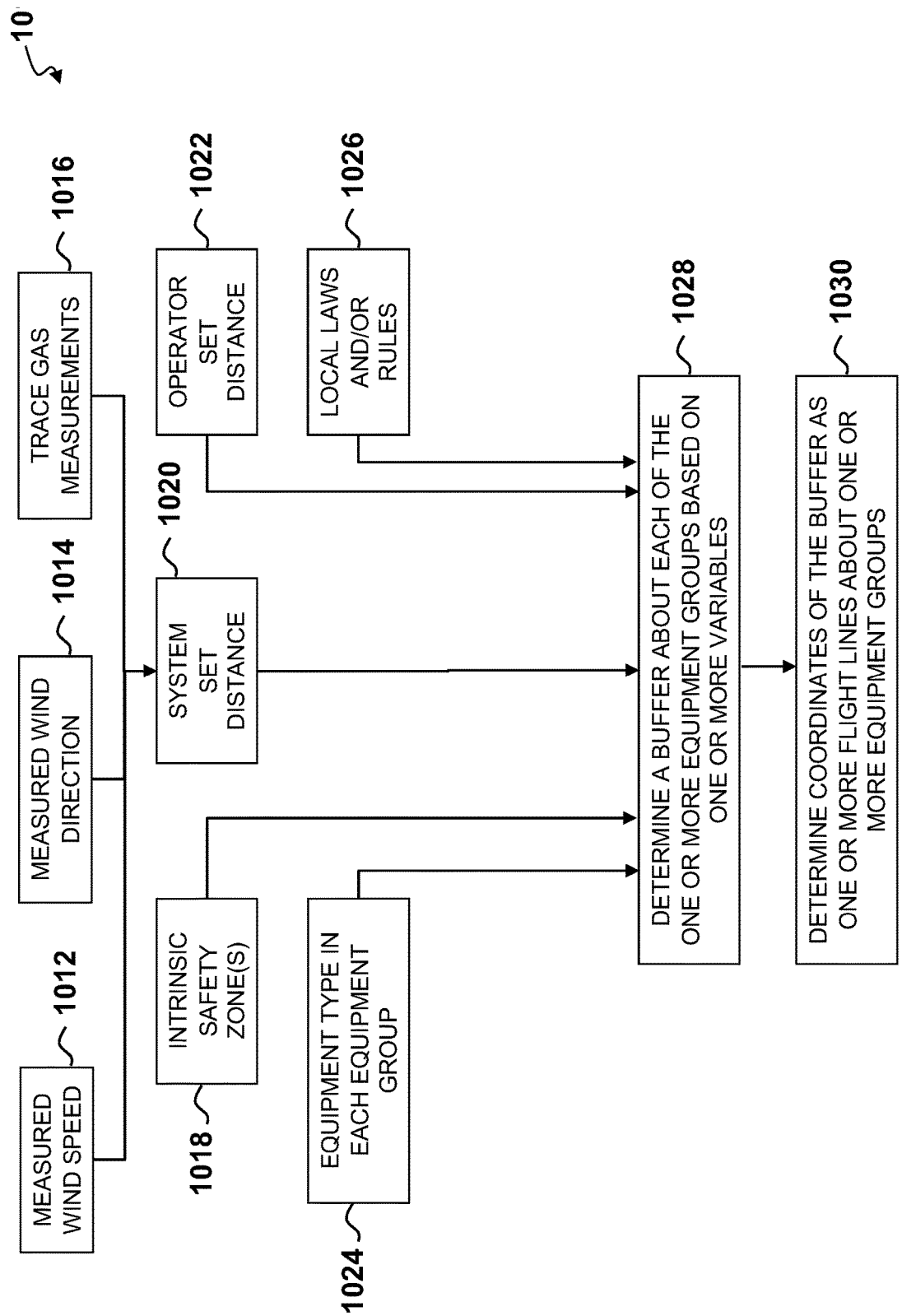
FIG. 10B depicts a high-level flowchart of a method embodiment of determining coordinates of one or more flight lines, according to one embodiment.

FIG. 10B depicts a high-level flowchart of a method embodiment 1010 of determining coordinates of one or more flight lines, according to one embodiment. In some embodiments, a system may set a distance around the determined geographical coordinates of each of the one or more equipment groups, as shown in FIG. 10A (step 1020). The system may receive inputs from a measured wind speed (step 1012), a measured wind direction (step 1014), and/or trace gas measurements (step 1016). By way of example, an increased wind speed may result in the system setting a greater distance (step 1020) from the determined geographical coordinates of each of the one or more equipment groups. A lower wind speed may result in the system setting a shorter distance (step 1020) from the determined geographical coordinates of each of the one or more equipment groups. A measured wind direction (step 1014) may result in the system setting a greater distance (step 1020) from one or more sides of the determined geographical coordinates of each of the one or more equipment groups and setting a shorter distance (step 1020) from one or more other sides of the determined geographical coordinates of each of the one or more equipment groups. Trace gas measurements (step 1016) detecting a possible gas leak and/or a trace gas plume may be used by the system to set a distance (step 1020) from the determined geographical coordinates of each of the one or more equipment groups so as to ensure a greater accuracy as to the presence of a gas leak or not. One or more intrinsic safety zones (step 1018) may be used to determine a distance from the determined geographical coordinates of each of the one or more equipment groups. In some embodiments, an operator may set a distance (step 1022) from the determined geographical coordinates of each of the one or more equipment groups. For example, the operator may set a distance (step 1022) based on a customer preference or operating procedures.

The equipment type in each equipment group (step 1024) may be used to determine a distance from the determined geographical coordinates of each of the one or more equipment groups. For example, certain potential trace gas sources may need a greater distance from any aerial vehicle and/or trace gas sensor so as to ensure safety of the potential trace gas source based on characteristics of the potential trace gas source. Local laws and/or rules (step 1026) may determine a distance from the determined geographical coordinates of each of the one or more equipment groups. For example, rules limited the use of aerial vehicles near certain potential trace gas source equipment types may require a minimum distance from such equipment types when measuring trace gas concentrations. The method 1010 may include determining a buffer about each of the one or more equipment groups based on the one or more variables (step 1028). The variables may include the intrinsic safety zones (step 1018), the system set distance (step 1020), the operator set distance (step 1022), the equipment type in each equipment group (step 1024), and/or the local laws and/or rules (step 1026). In some embodiments, the buffer about each equipment group may be substantially the same. In other embodiments, the buffer about each equipment group may vary based on the variables being applied to each equipment group. The method 1010 may then include determining coordinates of the buffer as one or more flight lines about one or more equipment groups (step 1030). In some embodiments, the determined coordinates comprise GPS coordinates. In some embodiments, the determined coordinates of the flight lines form a closed shape. In some embodiments, the closed shape formed by the flight lines corresponds to the closed shape formed by the one or more respective equipment groups. For example, a rectangular border containing an equipment group may be surrounded by a rectangular shape forming the flight lines.

Figure 10C:
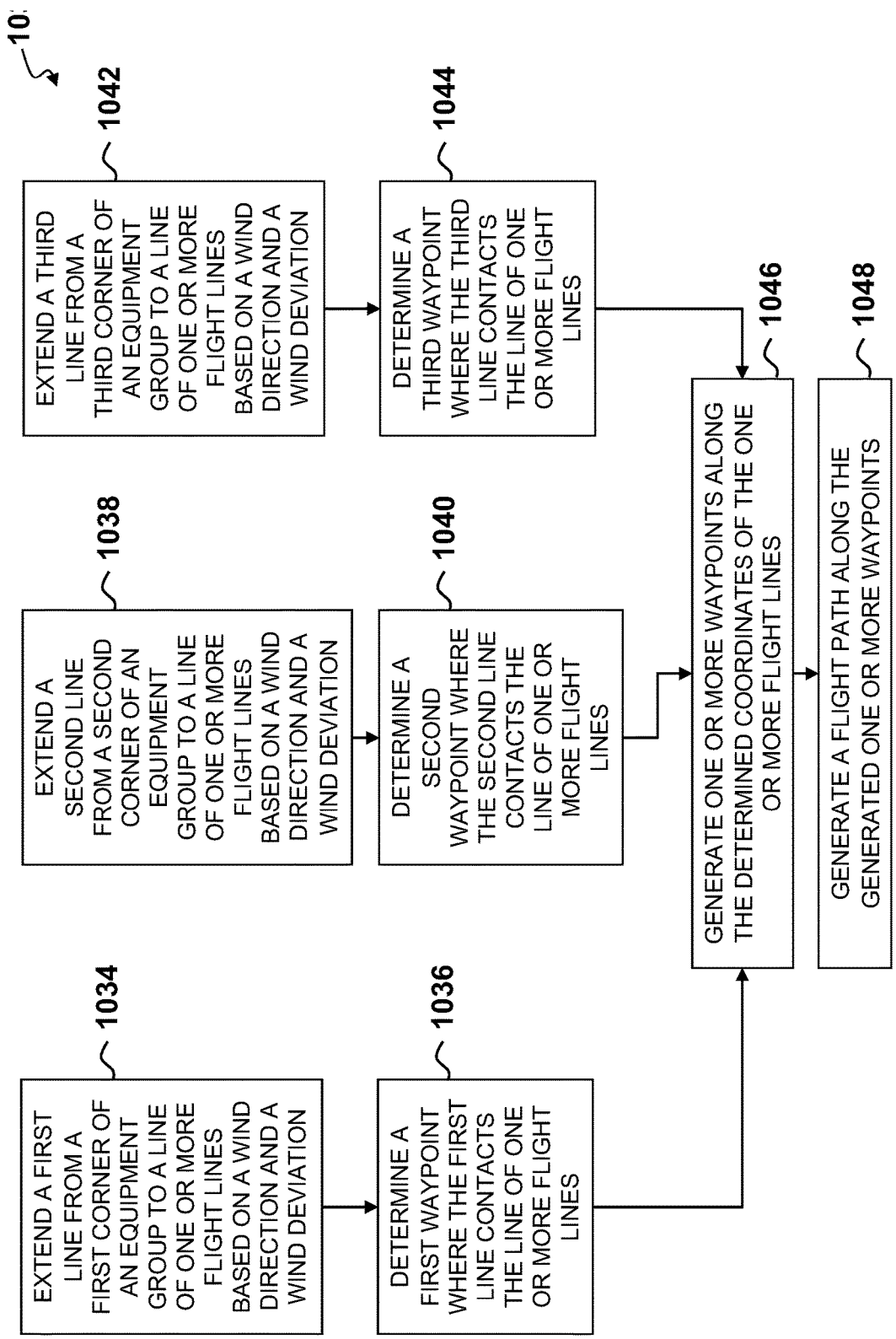
FIG. 10C depicts a high-level flowchart of a method embodiment of generating waypoints, according to one embodiment.

FIG. 10C depicts a high-level flowchart of a method embodiment 1032 of generating waypoints, according to one embodiment. A first line may be extended from a first corner of an equipment group to a line of one or more flight lines based on a wind direction and wind deviation (step 1034). In some embodiments, the wind deviation may be a standard deviation of wind direction. The method 1032 may then include determining a first waypoint where the first line contacts the line of one or more flight lines (step 1036). The first waypoint may be where the first line overlaps the flight lines. In some embodiments, the first waypoint may comprise a GPS coordinate.

A second line may be extended from a second corner of an equipment group to a line of one or more flight lines based on a wind direction and wind deviation (step 1038). In some embodiments, the wind deviation may be a standard deviation of wind direction. The method 1032 may then include determining a second waypoint where the second line contacts the line of one or more flight lines (step 1040). The second waypoint may be where the second line overlaps the flight lines. In some embodiments, the second waypoint may comprise a GPS coordinate.

A third line may be extended from a first corner of an equipment group to a line of one or more flight lines based on a wind direction and wind deviation (step 1042). In some embodiments, the wind deviation may be a standard deviation of wind direction. The method 1032 may then include determining a third waypoint where the third line contacts the line of one or more flight lines (step 1044). The third waypoint may be where the third line overlaps the flight lines. In some embodiments, the third waypoint may comprise a GPS coordinate.

Three waypoints are described for the purpose of illustrating the creation of waypoints for a rectangular equipment group, such as in FIGS. 3A-3C. A fourth waypoint is not needed for such a shape as a fourth line would intersect the flight lines along a path already covered by the three existing waypoints. Additional waypoints may be used for shapes having more than four sides in some embodiments. In other embodiments, only two waypoints may be used (such as 312 and 316 in FIGS. 3B-3C) and a flight plan may be constructed by connecting the waypoints along the flight lines (302, FIGS. 3B-3C) on the side of the equipment group (310, FIGS. 3B-3C) based on the wind direction such that the flight plan is downwind of the equipment group (310, FIGS. 3B-3C) and any gas plumes from the equipment group (310, FIGS. 3B-3C) could be detected by one or more trace gas sensors flying this flight plan.

The method 1032 may then include generating one or more waypoints along the determined coordinates of the one or more flight lines (step 1046). The waypoint locations may be determined as disclosed herein. The method 1032 may then include generating a flight path along the generated one or more waypoints (step 1048).

Figure 10D:
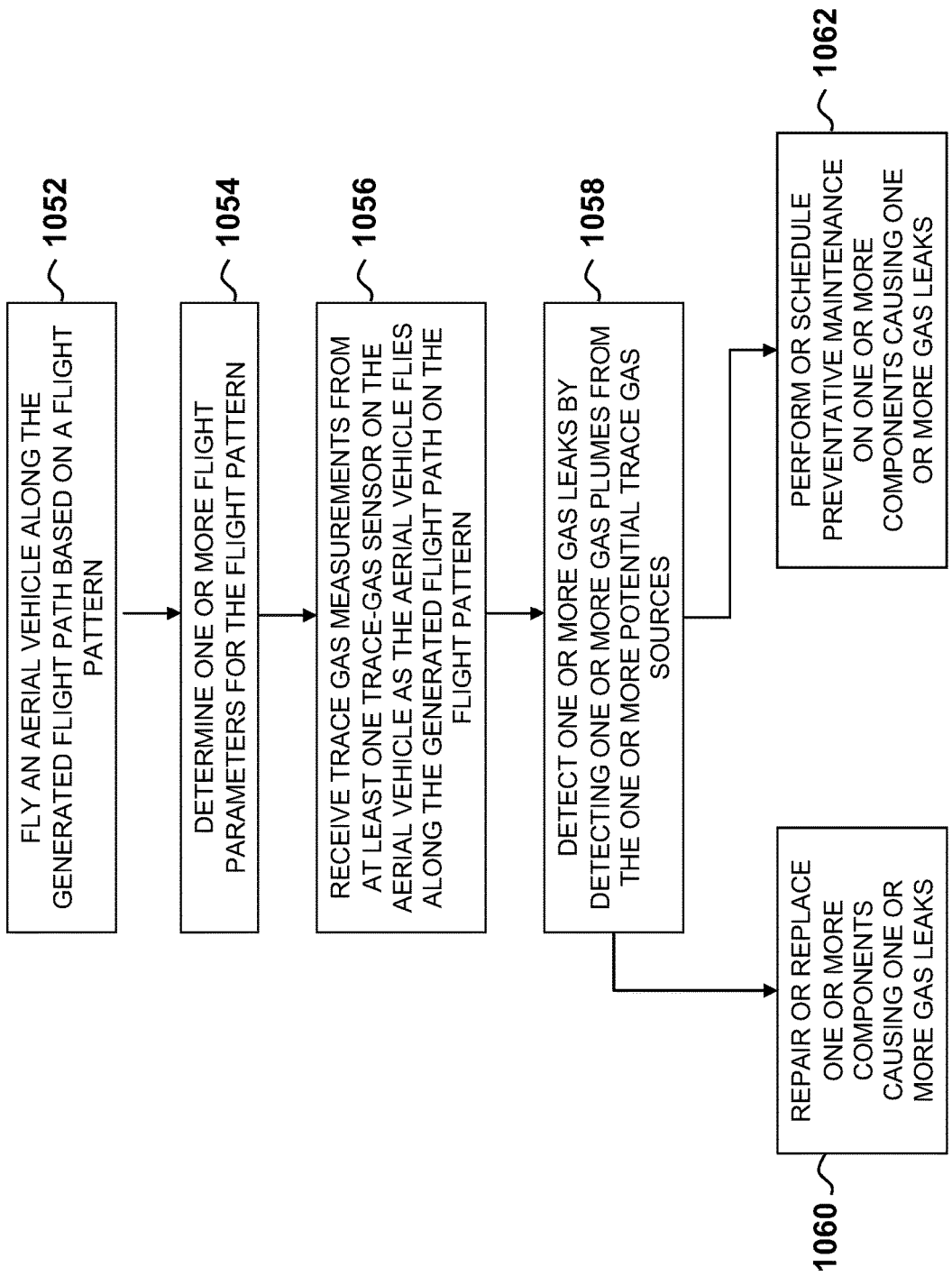
FIG. 10D depicts a high-level flowchart of a method embodiment of generating gas data from a trace-gas sensor, according to one embodiment.

FIG. 10D depicts a high-level flowchart of a method embodiment 1050 of generating gas data from a trace-gas sensor, according to one embodiment. The method 1050 may include flying an aerial vehicle along the generated flight path based on a flight pattern (step 1052). The flight pattern only encompasses a portion of the overall flight lines, as shown in FIG. 3C. An aerial vehicle with at least one trace-gas sensor can fly along the flight pattern instead of the entire circumference shown in the flight lines, as shown in FIG. 3C, which allows for increased efficiency, time savings, and energy savings. A processor of the system and/or an operator may plan and execute different flight patterns along the flight pattern, such as a downwind flight pattern (See FIG. 4A), an upwind flight pattern (See FIG. 4B), or a spiral flight pattern (See FIG. 4C).

The method 1050 may then include determining one or more flight parameters for the flight pattern (step 1054). The processor of the system and/or the operator may provide input on one or more flight parameters, such as minimum altitude, maximum altitude, a step change, and the like. The method 1050 may then include receive trace gas measurements from at least one trace-gas sensor on the aerial vehicle as the aerial vehicle flies along the generated flight path on the flight pattern.

The one or more trace-gas sensors may detect one or more gas plumes to detect one or more gas leaks from the one or more potential trace gas sources (step 1058). In response to detecting a gas leak (step 1058), one or more components causing the one or more gas leaks may be repaired or replaced (step 1060). In other embodiments, the one or more components of the equipment may be monitored for potential leaks in the future. In response to detecting a gas leak (step 1058), preventative maintenance may be performed or scheduled on one or more components of the equipment causing the one or more gas leaks (Step 1062).

The system may determine the number of data points per square meter needed to achieve a desired accuracy. For example, the system may determine that given a sample rate of X hertz, the aerial vehicle can fly at Y knots. The system may also determine the maximum step change during localization and quantification flights.

Figure 11:
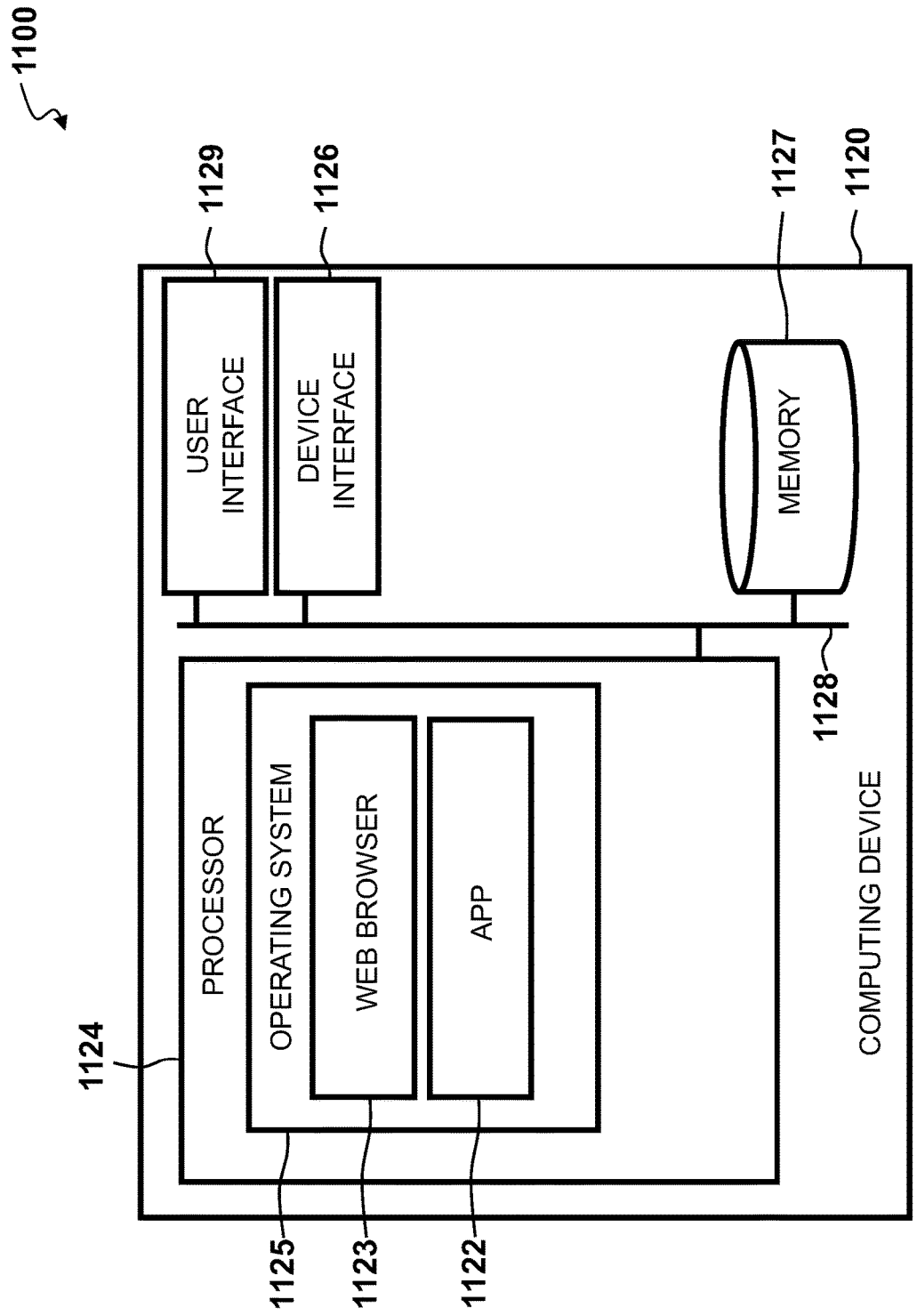
FIG. 11 illustrates an example top-level functional block diagram of a computing device embodiment.

FIG. 11 illustrates an example of a top-level functional block diagram of a computing device embodiment 1100. The example operating environment is shown as a computing device 1120 comprising a processor 1124, such as a central processing unit (CPU), addressable memory 1127, an external device interface 1126, e.g., an optional universal serial bus port and related processing, and/or an Ethernet port and related processing, and an optional user interface 1129, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 1128. In some embodiments, via an operating system 1125 such as one supporting a web browser 1123 and applications 1122, the processor 1124 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 12:
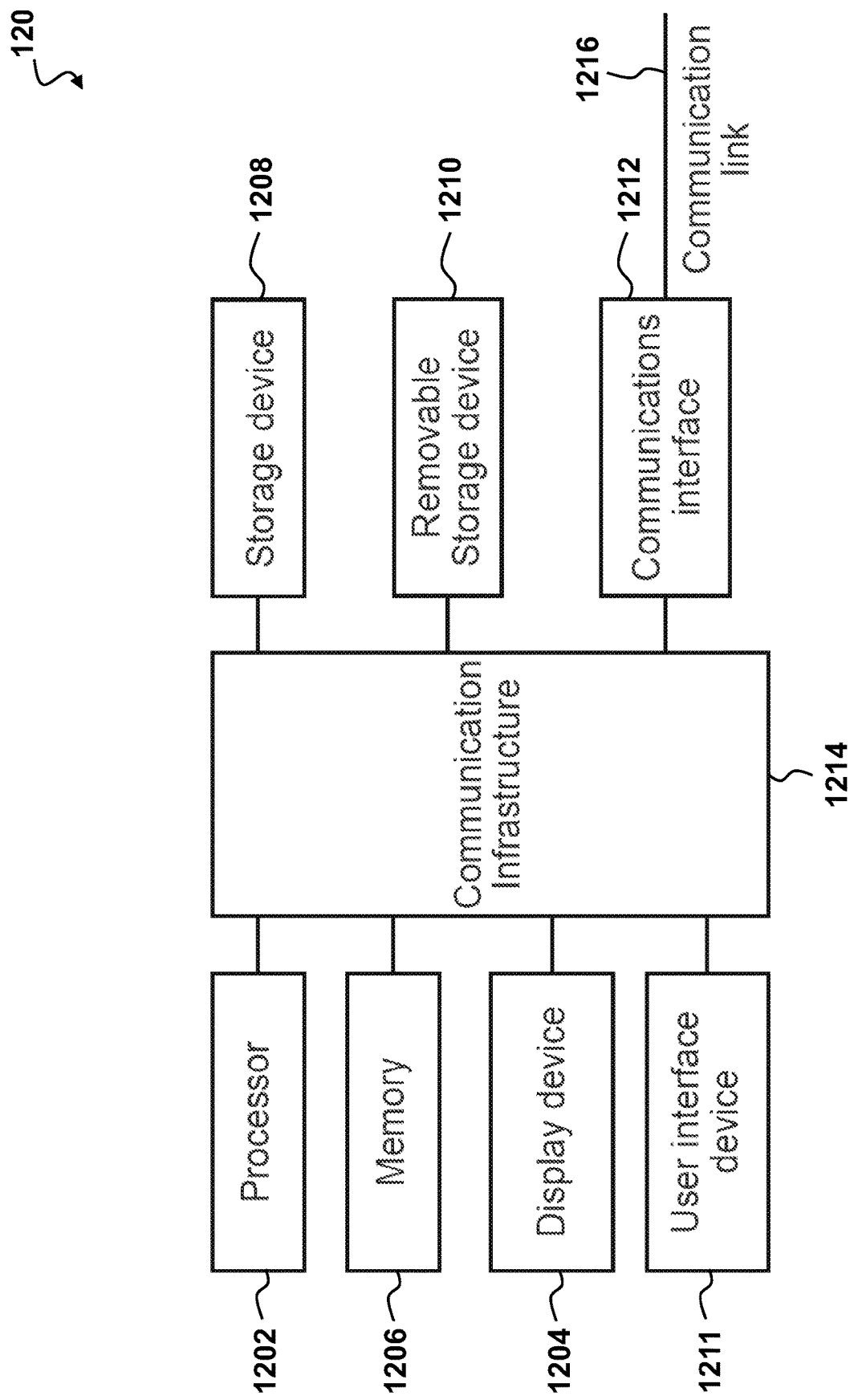
FIG. 12 shows a high-level block diagram and process of a computing system for implementing an embodiment of the system and process.

FIG. 12 is a high-level block diagram 1200 showing a computing system comprising a computer system useful for implementing an embodiment of the system and process, disclosed herein. Embodiments of the system may be implemented in different computing environments. The computer system includes one or more processors 1202, and can further include an electronic display device 1204 (e.g., for displaying graphics, text, and other data), a main memory 1206 (e.g., random access memory (RAM)), storage device 1208, a removable storage device 1210 (e.g., removable storage drive, a removable memory module, a magnetic tape drive, an optical disk drive, a computer readable medium having stored therein computer software and/or data), user interface device 1211 (e.g., keyboard, touch screen, keypad, pointing device), and a communication interface 1212 (e.g., modem, a network interface (such as an Ethernet card), a communications port, or a PCMCIA slot and card). The communication interface 1212 allows software and data to be transferred between the computer system and external devices. The system further includes a communications infrastructure 1214 (e.g., a communications bus, cross-over bar, or network) to which the aforementioned devices/modules are connected as shown.

Information transferred via communications interface 1214 may be in the form of signals such as electronic, electromagnetic, optical, or other signals capable of being received by communications interface 1214, via a communication link 1216 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1212. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 13:
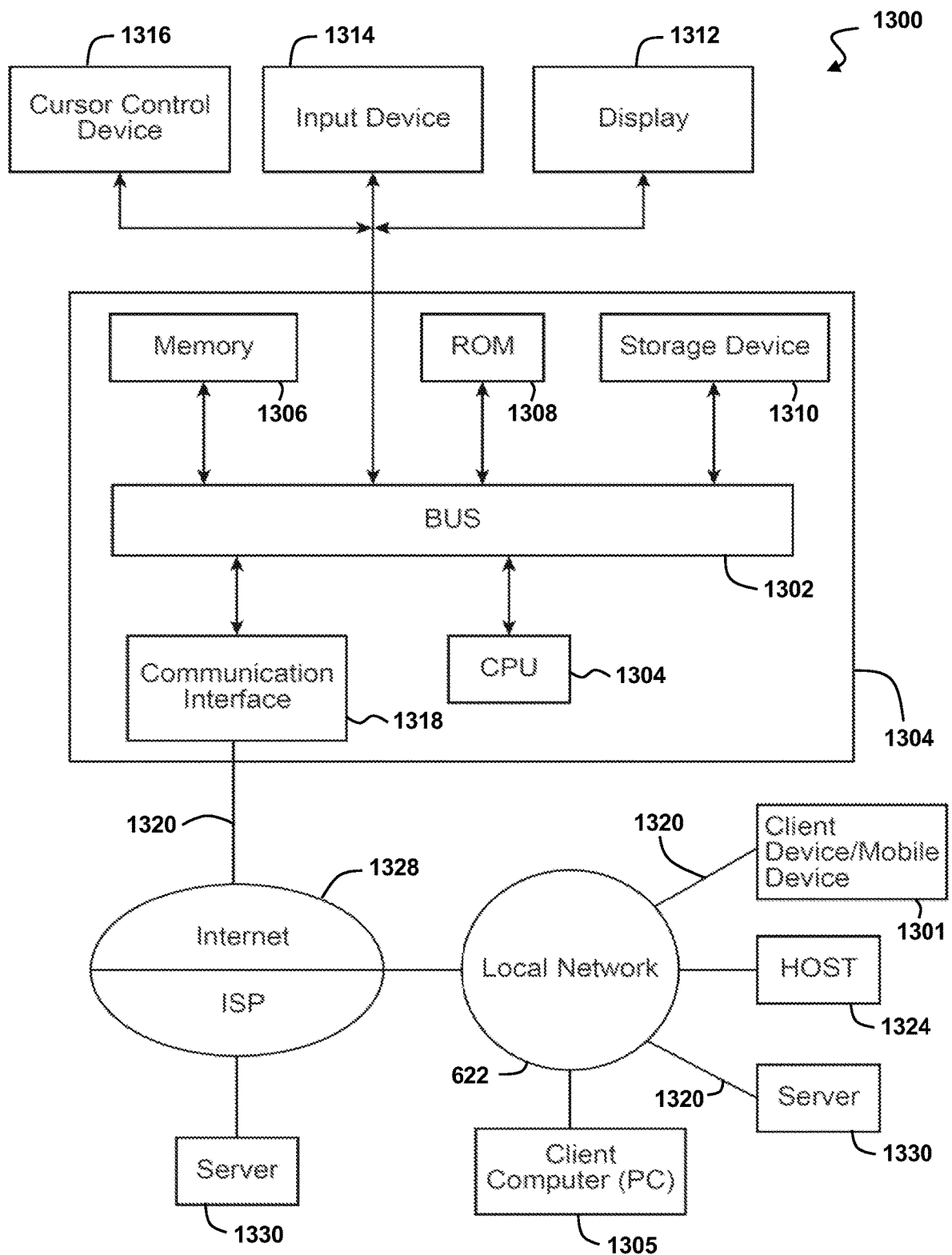
FIG. 13 shows a block diagram and process of an exemplary system in which an embodiment may be implemented.

FIG. 13 shows a block diagram of an example system 1300 in which an embodiment may be implemented. The system 1300 includes one or more client devices 1301 such as consumer electronics devices, connected to one or more server computing systems 1330. A server 1330 includes a bus 1302 or other communication mechanism for communicating information, and a processor (CPU) 1304 coupled with the bus 1302 for processing information. The server 1330 also includes a main memory 1306, such as a random access memory (RAM) or other dynamic storage device, coupled to the bus 1302 for storing information and instructions to be executed by the processor 1304. The main memory 1306 also may be used for storing temporary variables or other intermediate information during execution or instructions to be executed by the processor 1304. The server computer system 1330 further includes a read only memory (ROM) 1308 or other static storage device coupled to the bus 1302 for storing static information and instructions for the processor 1304. A storage device 1310, such as a magnetic disk or optical disk, is provided and coupled to the bus 1302 for storing information and instructions. The bus 1302 may contain, for example, thirty-two address lines for addressing video memory or main memory 1306. The bus 1302 can also include, for example, a 32-bit data bus for transferring data between and among the components, such as the CPU 1304, the main memory 1306, video memory and the storage 1310. Alternatively, multiplex data/address lines may be used instead of separate data and address lines.

The server 1330 may be coupled via the bus 1302 to a display 1312 for displaying information to a computer user. An input device 1314, including alphanumeric and other keys, is coupled to the bus 1302 for communicating information and command selections to the processor 1304. Another type or user input device comprises cursor control 1316, such as a mouse, a trackball, or cursor direction keys for communicating direction information and command selections to the processor 1304 and for controlling cursor movement on the display 1312.

According to one embodiment, the functions are performed by the processor 1304 executing one or more sequences of one or more instructions contained in the main memory 1306. Such instructions may be read into the main memory 1306 from another computer-readable medium, such as the storage device 1310. Execution of the sequences of instructions contained in the main memory 1306 causes the processor 1304 to perform the process steps described herein. One or more processors in a multi-processing arrangement may also be employed to execute the sequences of instructions contained in the main memory 1306. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1304 for execution. Such a medium may take many forms, including but not limited to, non-volatile media, volatile media, and transmission media. Non-volatile media includes, for example, optical or magnetic disks, such as the storage device 1310. Volatile media includes dynamic memory, such as the main memory 1306. Transmission media includes coaxial cables, copper wire and fiber optics, including the wires that comprise the bus 1302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1304 for execution. For example, the instructions may initially be carried on a magnetic disk of a remote computer. The remote computer can load the instructions into its dynamic memory and send the instructions over a telephone line using a modem. A modem local to the server 1330 can receive the data on the telephone line and use an infrared transmitter to convert the data to an infrared signal. An infrared detector coupled to the bus 1302 can receive the data carried in the infrared signal and place the data on the bus 1302. The bus 1302 carries the data to the main memory 1306, from which the processor 1304 retrieves and executes the instructions. The instructions received from the main memory 1306 may optionally be stored on the storage device 1310 either before or after execution by the processor 1304.

The server 1330 also includes a communication interface 1318 coupled to the bus 1302. The communication interface 1318 provides a two-way data communication coupling to a network link 1320 that is connected to the world wide packet data communication network now commonly referred to as the Internet 1328. The Internet 1328 uses electrical, electromagnetic or optical signals that carry digital data streams. The signals through the various networks and the signals on the network link 1320 and through the communication interface 1318, which carry the digital data to and from the server 1330, are exemplary forms or carrier waves transporting the information.

In another embodiment of the server 1330, interface 1318 is connected to a network 1322 via a communication link 1320. For example, the communication interface 1318 may be an integrated services digital network (ISDN) card or a modem to provide a data communication connection to a corresponding type of telephone line, which can comprise part of the network link 1320. As another example, the communication interface 1318 may be a local area network (LAN) card to provide a data communication connection to a compatible LAN. Wireless links may also be implemented. In any such implementation, the communication interface 1318 sends and receives electrical electromagnetic or optical signals that carry digital data streams representing various types of information.

The network link 1320 typically provides data communication through one or more networks to other data devices. For example, the network link 1320 may provide a connection through the local network 1322 to a host computer 1324 or to data equipment operated by an Internet Service Provider (ISP). The ISP in turn provides data communication services through the Internet 1328. The local network 1322 and the Internet 1328 both use electrical, electromagnetic or optical signals that carry digital data streams. The signals through the various networks and the signals on the network link 1320 and through the communication interface 1318, which carry the digital data to and from the server 1330, are exemplary forms or carrier waves transporting the information.

The server 1330 can send/receive messages and data, including e-mail, program code, through the network, the network link 1320 and the communication interface 1318. Further, the communication interface 1318 can comprise a USB/Tuner and the network link 1320 may be an antenna or cable for connecting the server 1330 to a cable provider, satellite provider or other terrestrial transmission system for receiving messages, data and program code from another source.

The example versions of the embodiments described herein may be implemented as logical operations in a distributed processing system such as the system 1300 including the servers 1330. The logical operations of the embodiments may be implemented as a sequence of steps executing in the server 1330, and as interconnected machine modules within the system 1300. The implementation is a matter of choice and can depend on performance of the system 1300 implementing the embodiments. As such, the logical operations constituting said example versions of the embodiments are referred to for e.g., as operations, steps or modules.

Similar to a server 1330 described above, a client device 1301 can include a processor, memory, storage device, display, input device and communication interface (e.g., e-mail interface) for connecting the client device to the Internet 1328, the ISP, or LAN 1322, for communication with the servers 1330.

The system 1300 can further include computers (e.g., personal computers, computing nodes) 1305 operating in the same manner as client devices 1301, where a user can utilize one or more computers 1305 to manage data in the server 1330.

Figure 14:
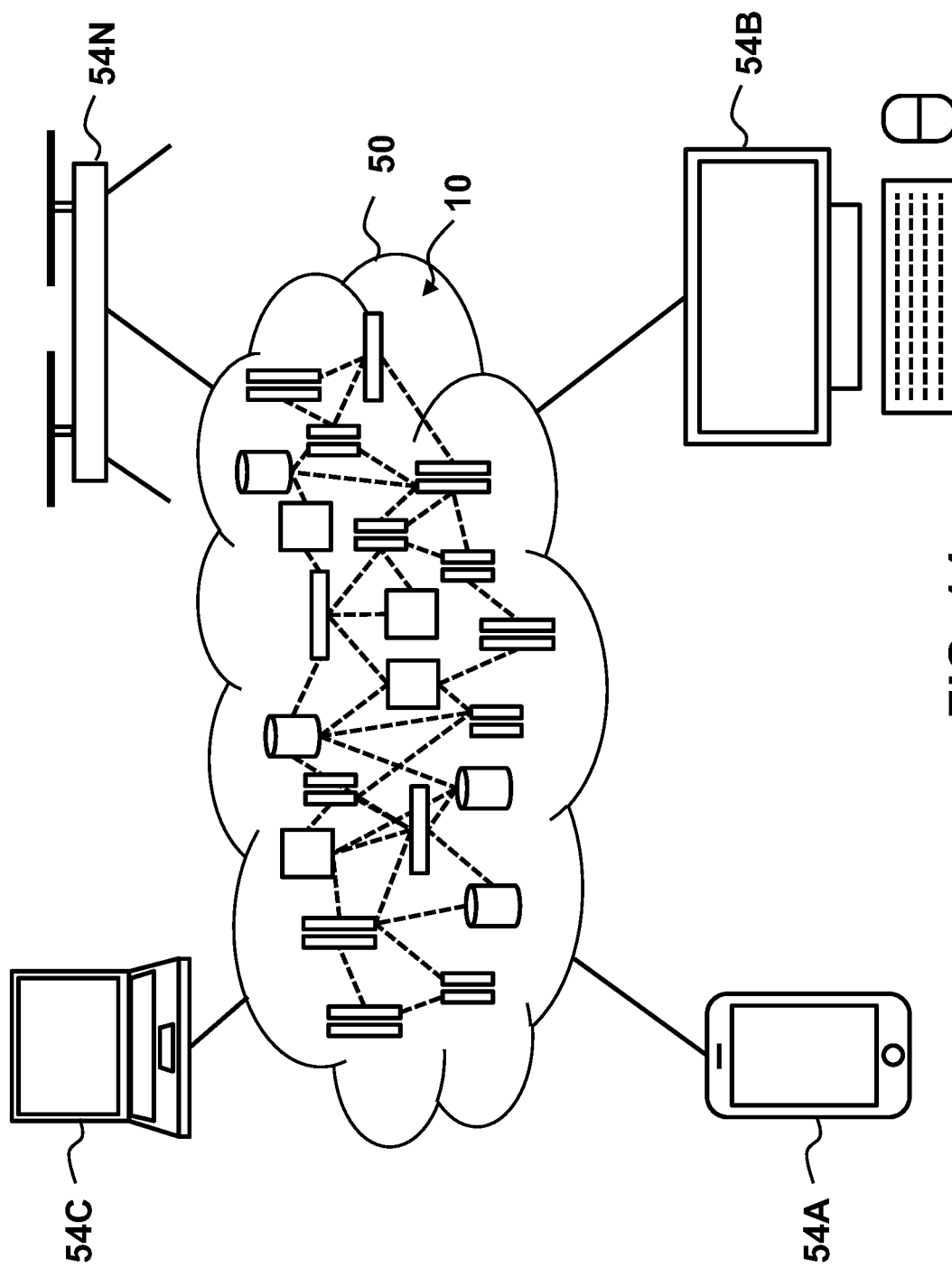
FIG. 14 depicts a cloud computing environment for implementing an embodiment of the system and process disclosed herein.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or UAV 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
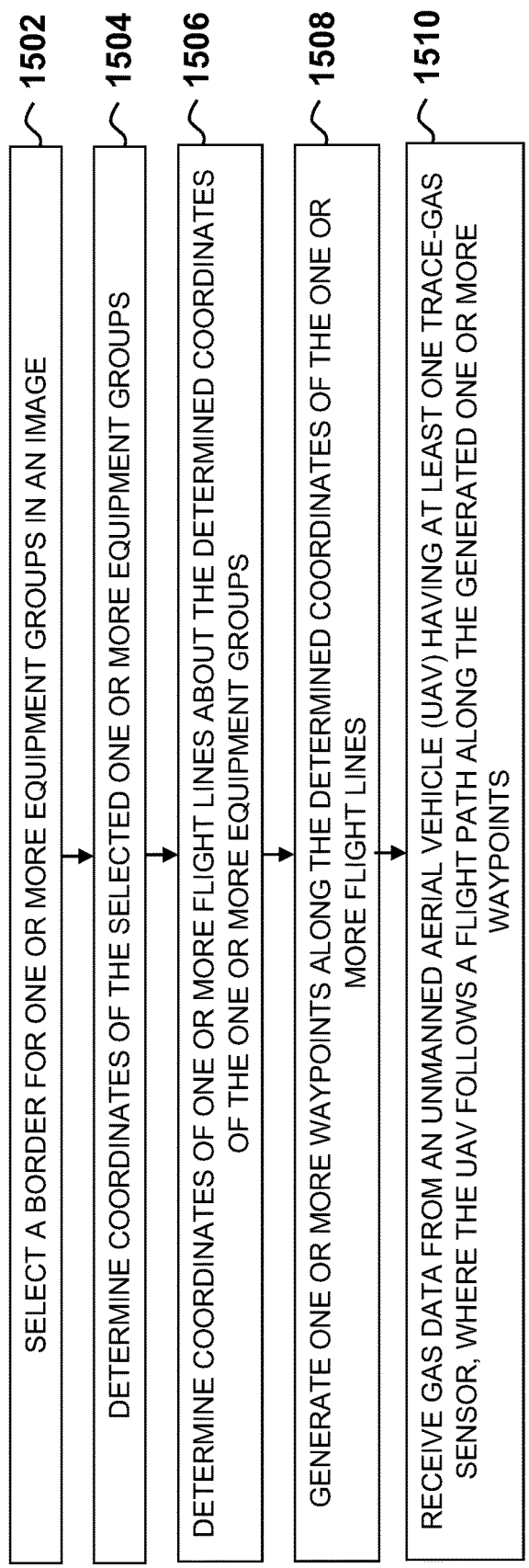
FIG. 15 depicts a high-level flowchart of a method embodiment of detecting gas leaks within one or more equipment groups, according to one embodiment.

FIG. 15 depicts a high-level flowchart of a method 1500 embodiment of detecting gas leaks within one or more equipment groups, according to one embodiment. The method 1500 may include selecting a border for one or more equipment groups in an image (step 1502). The selected border may be in an image, map, engineering drawing, or other. The method 500 may then include determining coordinates of the selected one or more equipment groups (step 1504). The method may then include determining coordinates of one or more flight lines about the determined coordinates of the one or more equipment groups (step 1506). The method 1500 may then include generating one or more waypoints along the determined coordinates of the one or more flight lines (step 1508). The method may then include receiving gas data from an unmanned aerial vehicle (UAV) having at least one trace-gas sensor, where the UAV follows a flight path along the generated one or more waypoints (step 1510).

Figure 16:
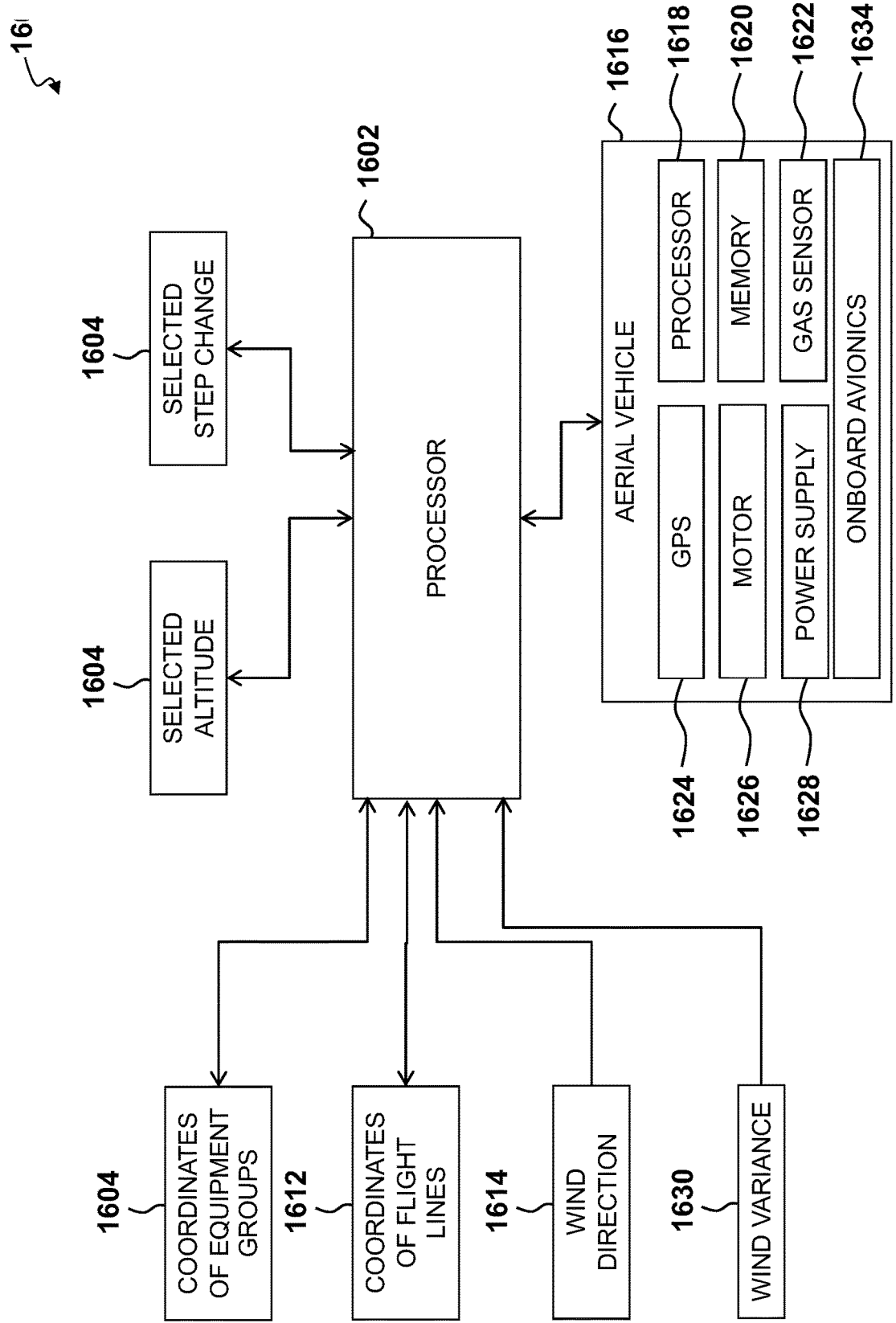
FIG. 16 depicts a high-level block diagram of a gas leak detection system, according to one embodiment.

FIG. 16 depicts a high-level block diagram of a gas leak detection system 1600, according to one embodiment. The system 1600 includes a processor 1602. The processor 1602 receives coordinates, such as global positioning system (GPS) coordinates, of one or more equipment groups 1604. The coordinates of the one or more equipment groups 1604 may be determined based on a border drawn by a user on an image of an area of interest in one embodiment. In another embodiment, the coordinates of the one or more equipment groups 1604 may be determined by the processor 1602, such as through object recognition. In another embodiment, the coordinates of the one or more equipment groups 1604 may be retrieved from stored data.

The processor 1602 may also receive coordinates, such as GPS coordinates, of one or more flight lines 1612. The coordinates of the one or more flight lines 1612 encompass the coordinates of the one or more equipment groups 1604. The coordinates of the one or more flight lines 1612 may be a buffer around the coordinates of the one or more equipment groups 1604. The size of the buffer may be based on a type of equipment in the one or more equipment groups, a wind direction 1614, a wind variance 1630, a selected altitude 1604, a selected step change 1604, a desired confidence level, any possible obstructions, any user preferences, and/or any local rules, regulations, or laws. In some embodiments, the buffer may be a set distance from a boundary of the equipment groups. The coordinates of the one or more flight lines 1612 do not overlap the coordinates of the one or more equipment groups 1604.

The processor 1602 may also receive data on wind direction 614. The wind direction 1614 may be measured at the site proximate the equipment group, from a third party service, based on a prediction, and/or measured on one or more aerial vehicles proximate the equipment group. In some embodiments, the processor 1602 may also receive wind speed.

The processor 1602 may also receive a wind variance 1630. Current wind direction and/or average wind direction may be measured. A standard deviation of the wind direction may also be determined to account for variable wind conditions.

The processor 1602 may use the coordinates of the equipment groups 1604, coordinates of the flight lines 1612, wind direction 1614, and/or wind variance 1630 to generate one or more waypoints along the determined coordinates of the one or more flight lines 1612. The waypoints may be used to generate a flight path. In some embodiments, a user may select an altitude 1604 and a step change 1604 for the flight path. In other embodiments, the processor 1602 may determine the altitude and step change based on one or more variables, such as a desired confidence level for detecting trace-gas.

In some embodiments, the waypoints and/or flight path may be recalculated due to changes in the wind direction. For example, a wind change outside of the calculated wind variance 1630 may require a change in the flight path. In some embodiments, the aerial vehicle 1616 can land and a new flight path and waypoints may be uploaded to the aerial vehicle 1616. In other embodiments, the flight path and waypoints may be dynamically adjusted during flight.

An aerial vehicle 1616, such as an unmanned aerial vehicle (UAV), having at least one trace-gas sensor 1622 may then follow a flight path based on the generated waypoints from the processor 1602. The aerial vehicle 1616 may generate gas data as it follows the flight path along the generated one or more waypoints. Each equipment group may contain one or more potential gas sources that may leak toxic gases, such as hydrogen disulfide, or environmentally damaging gases, such as methane and sulfur dioxide.

In some embodiments, the at least one gas sensor 1622 may be configured to detect carbon dioxide. In other embodiments, the at least one gas sensor 1622 may be configured to detect nitrogen oxide. In other embodiments, the at least one gas sensor 822 may be configured to detect sulfur oxide, such as SO, SO2, SO3, S7O2, S6O2, S2O2, and the like.

The aerial vehicle 1616 may have a processor 1618 in communication with addressable memory 1620, a GPS 1624, one or more motors 1626, and a power supply 1628. The aerial vehicle 1616 may receive the flight plan from the processor 1602 and communicate gathered gas sensor 1622 sensor to the processor 1602. The GPS 1624 may record the location of the aerial vehicle 1616 when each gas sensor 1622 data is acquired. The GPS 1624 may also allow the aerial vehicle 1616 to travel the flight path generated by the processor 1602. In some embodiments, the location of the aerial vehicle 1616 may be determined by an onboard avionics 1634. The onboard avionics 1634 may include a triangulation system, a beacon, a spatial coordinate system, or the like. The onboard avionics 1634 may be used with the GPS 1624 in some embodiments. In other embodiments, the aerial vehicle 1616 may use only one of the GPS 1624 and the onboard avionics 1634.

The power supply 1628 may be a battery in some embodiments. The power supply 1628 may limit the available flight time for the aerial vehicle 1616 and so it is crucial that the potential plume envelopes are accurate to allow for data that can be used to make a determination as to whether there are any gas leaks within the desired level of confidence 1612. In some embodiments, the flight plan may be split up into two or more flights based on a size of the potential plumes, a flight time of the aerial vehicle 1616, weather conditions, and the like. In some embodiments, the processor 1602 may be a part of the aerial vehicle 1616, a cloud computing device, a ground control station (GCS) used to control the aerial vehicle 1616, or the like.

The processor 1602 may receive gas data from the one or more gas sensors 1622 of the aerial vehicle 1616. The processor may then determine, based on the received gas data, whether a gas leak is present in the received spatial location to a desired level of confidence. If a gas leak is not detected, no immediate action is needed and further tests may be accomplished in the future to ensure that no gas leaks develop. If a gas leak is detected, then corrective action may be taken to minimize and/or stop the gas leak.

In some embodiments, the processor 1602 may be in communication with addressable memory 1630. The memory may store the result of whether a gas leak was detected, historical gas data, and/or aerial vehicle 1616 information. In some embodiments, the processor 1602 may be in communication with an additional processor that may be a part of the aerial vehicle 1616, a cloud computing device, a GCS used to control the aerial vehicle 1616, or the like.

Figure 17:
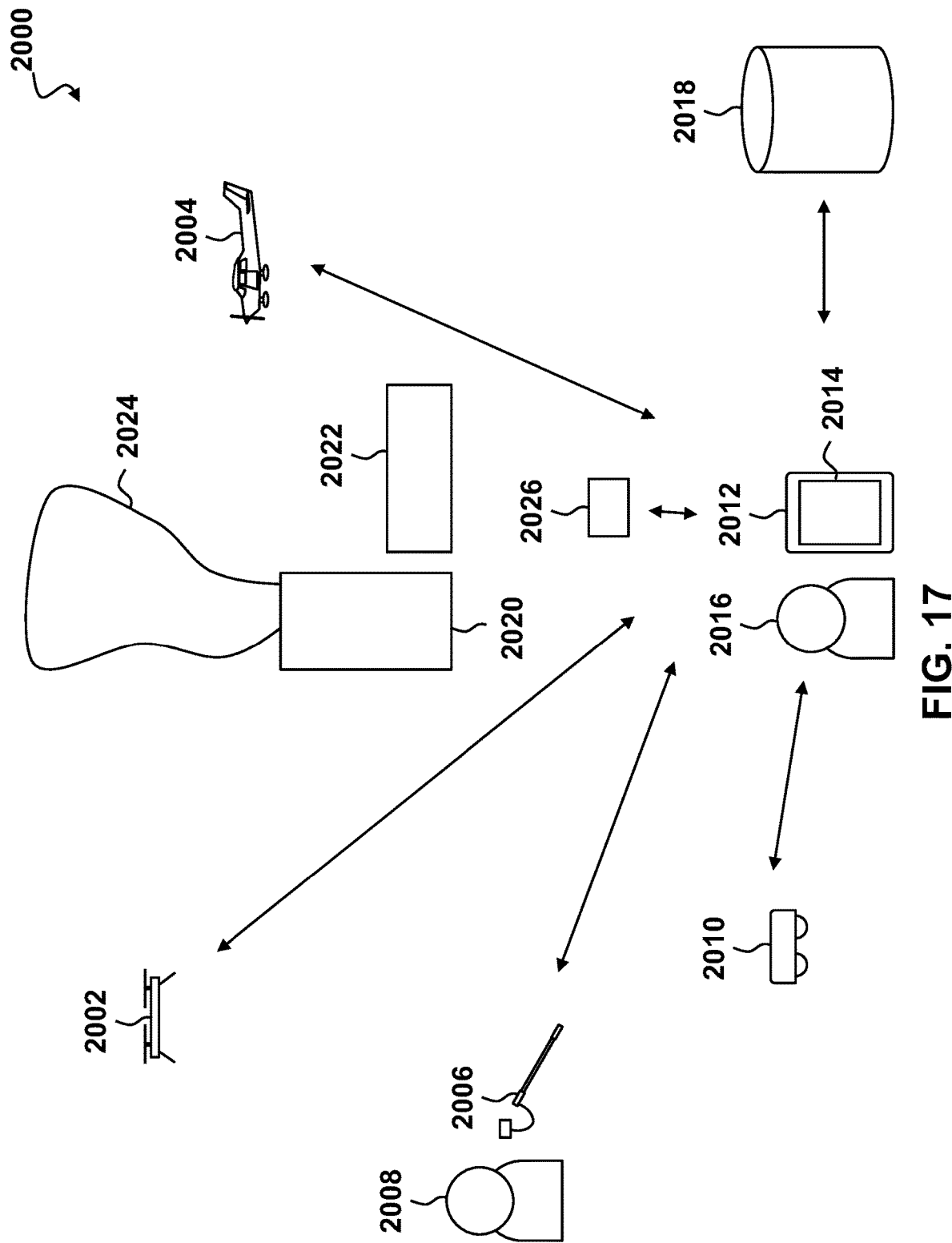
FIG. 17 depicts a system for detecting trace gasses, according to one embodiment.

FIG. 17 depicts a system 2000 for detecting trace gasses, according to one embodiment. The system may include one or more trace gas sensors located in one or more vehicles 2002, 2004, 2006, 2010. The one or more trace gas sensors may detect elevated trace gas concentrations from one or more potential gas sources 2020, 2022, such as a holding tank, pipeline, or the like. The potential gas sources 2020, 2022 may be part of a large facility, a small facility, or any location. The potential gas sources 2020, 2022 may be clustered and/or disposed distal from one another. The one or more trace gas sensors may be used to detect and quantify leaks of toxic gases, e.g., hydrogen disulfide, or environmentally damaging gases, e.g., methane, sulfur dioxide) in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks. In some embodiments, the at least one trace gas sensor may be configured to detect methane. In other embodiments, the at least one trace gas sensor may be configured to detect sulfur oxide, such as SO, $SO_2$, $SO_3$, $S7O_2$, $S6O_2$, $S2O_2$, and the like. A trace gas leak 2024 may be present in a potential gas source 2020. The one or more trace gas sensors may be used to identify the trace gas leak 2024 and/or the source 2020 of the trace gas leak 2024 so that corrective action may be taken.

The one or more vehicles 2002, 2004, 2006, 2010 may include an unmanned aerial vehicle (UAV) 2002, an aerial vehicle 2004, a handheld device 2006, and a ground vehicle 2010. In some embodiments, the UAV 2002 may be a quadcopter or other device capable of hovering, making sharp turns, and the like. In other embodiments, the UAV 2002 may be a winged aerial vehicle capable of extended flight time between missions. The UAV 2002 may be autonomous or semi-autonomous in some embodiments. In other embodiments, the UAV 2002 may be manually controlled by a user. The aerial vehicle 2004 may be a manned vehicle in some embodiments. The handheld device 2006 may be any device having one or more trace gas sensors operated by a user 2008. In one embodiment, the handheld device 2006 may have an extension for keeping the one or more trace gas sensors at a distance from the user 2008. The ground vehicle 2010 may have wheels, tracks, and/or treads in one embodiment. In other embodiments, the ground vehicle 2010 may be a legged robot. In some embodiments, the ground vehicle 2010 may be used as a base station for one or more UAVs 2002. In some embodiments, one or more aerial devices, such as the UAV 2002, a balloon, or the like, may be tethered to the ground vehicle 2010. In some embodiments, one or more trace gas sensors may be located in one or more stationary monitoring devices 2026. The one or more stationary monitoring devices may be located proximate one or more potential gas sources 2020, 2022. In some embodiments, the one or more stationary monitoring devices may be relocated.

The one or more vehicles 2002, 2004, 2006, 2010 and/or stationary monitoring devices 2026 may transmit data including trace gas data to a ground control station (GCS) 2012. The GCS may include a display 2014 for displaying the trace gas concentrations to a GCS user 2016. The GCS user 2016 may be able to take corrective action if a gas leak 2024 is detected, such as by ordering a repair of the source 2020 of the trace gas leak. The GCS user 2016 may be able to control movement of the one or more vehicles 2002, 2004, 2006, 2010 in order to confirm a presence of a trace gas leak in some embodiments.

In some embodiments, the GCS 2012 may transmit data to a cloud server 2018. In some embodiments, the cloud server 2018 may perform additional processing on the data. In some embodiments, the cloud server 2018 may provide third party data to the GCS 2012, such as wind speed, temperature, pressure, weather data, or the like.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:
1. A system comprising:
  at least one trace-gas sensor configured to be disposed on an unmanned aerial vehicle (UAV);
  a processor having addressable memory, the processor configured to:
    determine coordinates of one or more equipment groups;
    determine coordinates of one or more flight lines about the determined coordinates of the one or more equipment groups;
    generate one or more waypoints along the determined coordinates of the one or more flight lines;
    generate at least one flight path along the generated one or more waypoints; and wherein the trace-gas sensor is configured to generate trace gas data when the UAV is configured to follow the at least one flight path along the one or more waypoints,
wherein the one or more flight lines are predetermined paths around the one or more equipment group before generating the at least one flight path, and
wherein each of the at least one flight path encompasses a portion of each of the one or more flight lines.

2. The system of claim 1, wherein the processor is further configured to:
select a border for the one or more equipment groups;
wherein the determined coordinates of the one or more equipment groups comprise one or more global positioning system (GPS) coordinates, and wherein the determined coordinates for the one or more flight lines comprise one or more GPS coordinates; and
wherein the determined coordinates of the one or more flight lines comprise a buffer based on the determined coordinates of the one or more equipment groups.

3. The system of claim 2, wherein the buffer is based on an equipment type in the one or more equipment groups, a user preference corresponding to the equipment type, and one or more rules or laws corresponding to the equipment type.

4. The system of claim 1, wherein the generated one or more waypoints are based on at least one of: an equipment type in the one or more equipment groups, a wind direction, a wind variation, and one or more obstacles located proximate the one or more equipment groups.

5. The system of claim 1, wherein the generated one or more waypoints are based on an equipment type in the one or more equipment groups.

6. The system of claim 5, wherein the generated at least one flight path along the generated one or more waypoints are outside of a designated safety zone.

7. The system of claim 6, wherein the generated at least one flight path along the generated one or more waypoints is dynamically changed given one or more of: a wind speed and a wind direction.

8. The system of claim 5, wherein the generated one or more waypoints based on extending lines from a wind direction and a first standard deviation of the wind direction from a corner of the one or more equipment groups.

9. The system of claim 5, wherein the processor is further configured to:
determine one or more standard deviations of a wind direction to account for variable wind conditions.

10. The system of claim 9, wherein the generated one or more waypoints are further based on the determined one or more standard deviations of the wind direction.

11. The system of claim 1, wherein the determined coordinates of the one or more equipment groups forms a first closed shape, and wherein the determined coordinates of the one or more flight lines forms a second closed shape.

12. The system of claim 1, wherein the at least one flight path comprises one or more of: a downwind flight pattern, an upwind flight pattern, and a spiral flight pattern.

13. The system of claim 1, wherein the one or more flight lines indicate one or more potential flight lines, and at least one flight path indicates at least one actual flight path that the UAV is configured to follow to generate the trace gas data.

14. The system of claim 13, wherein the coordinates of the one or more potential flight lines is determined about the determined coordinates of the one or more equipment groups at a distance, wherein the one or more potential flight lines include a closed shape.

15. The system of claim 13, wherein each of the at least one actual flight path is determined by a portion of each of the one or more potential flight lines based on at least one of wind direction and wind variance.

16. A method comprising:
determining coordinates of one or more equipment groups;
determining coordinates of one or more flight lines about the determined coordinates of the one or more equipment groups; and
generating one or more waypoints along the determined coordinates of the one or more flight lines;
generating at least one flight path along the one or more waypoints; and
receiving trace gas data from at least one trace-gas sensor configured to be on an unmanned aerial vehicle (UAV), wherein the UAV is configured to follow the at least one flight path along the one or more waypoints,
wherein the one or more flight lines are predetermined paths around the one or more equipment group before generating the at least one flight path, and
wherein each of the at least one flight path encompasses a portion of each of the one or more flight lines.

17. The method of claim 16, wherein generating the one or more waypoints further comprises: generating the one or more waypoints based on one or more of: a wind direction standard deviation, the one or more equipment groups, and a buffer based on coordinates of the one or more equipment groups.

18. The method of claim 16, further comprising:
selecting a border for the one or more equipment groups in an image.

19. The method of claim 16, wherein the determined coordinates of the one or more equipment groups comprise one or more global positioning system (GPS) coordinates, and wherein the determined coordinates for the one or more flight lines comprise one or more GPS coordinates.

20. The method of claim 16, wherein the determined coordinates of the one or more flight lines comprise a buffer based on the determined coordinates of the one or more equipment groups.

21. The method of claim 20, wherein the buffer is based on at least one of: an equipment type in the one or more equipment groups, a user preference corresponding to the equipment type, and one or more rules or laws corresponding to the equipment type.

22. The method of claim 16, wherein the generated one or more waypoints are based on at least one of: an equipment type in the one or more equipment groups, a wind direction, a wind variation, and one or more obstacles located proximate the one or more equipment groups.

23. The method of claim 16, wherein the determined coordinates of the one or more equipment groups forms a first closed shape, and wherein the determined coordinates of the one or more flight lines forms a second closed shape.

24. The method of claim 16, wherein the one or more flight lines indicate one or more potential flight lines, and at least one flight path indicates at least one actual flight path that the UAV is configured to follow to generate the trace gas data.

25. The method of claim 24, wherein the coordinates of the one or more potential flight lines is determined about the determined coordinates of the one or more equipment groups at a distance, wherein the one or more potential flight lines include a closed shape.

26. The method of claim 24, wherein each of the at least one actual flight path is determined by a portion of each of the one or more potential flight lines based on at least one of wind direction and wind variance.

\* \* \* \* \*